(12) United States Patent
Cheung et al.

(10) Patent No.: US 7,028,911 B2
(45) Date of Patent: Apr. 18, 2006

(54) METHODS AND SYSTEMS FOR ENCODING AND DECODING DATA IN 2D SYMBOLOGY

(75) Inventors: Wai Cheung, North Point (HK); Zhi-guo Chang, ShenZhen (CN); Shillin Ding, ShenZhen (CN); Ying-feng Lv, ShenZhen (CN)

(73) Assignee: Shenzhen Syscan Technology Co. Limited, (CN)

( * ) Notice: Subject to any disclaimer, the term of this patent is extended or adjusted under 35 U.S.C. 154(b) by 267 days.

(21) Appl. No.: 10/634,283

(22) Filed: Aug. 5, 2003

(65) Prior Publication Data

US 2004/0026510 A1 Feb. 12, 2004

(30) Foreign Application Priority Data

Aug. 7, 2002 (CN) .................................. 02134545
May 22, 2003 (CN) .................................. 03117955

(51) Int. Cl.
*G06K 19/06* (2006.01)
(52) U.S. Cl. .................................... 235/494; 235/462.09
(58) Field of Classification Search ................ 235/494, 235/462.09, 462.1, 462.11, 462.12, 462.16, 235/462.2
See application file for complete search history.

(56) References Cited

U.S. PATENT DOCUMENTS

| | | | | |
|---|---|---|---|---|
| 3,632,995 A * | 1/1972 | Wilson | ...................... | 235/494 |
| 4,896,029 A * | 1/1990 | Chandler et al. | ............ | 235/494 |
| 4,924,078 A * | 5/1990 | Sant'Anselmo et al. | .... | 235/494 |
| 4,999,617 A * | 3/1991 | Uemura et al. | ............. | 345/156 |
| 5,243,655 A * | 9/1993 | Wang | .................... | 235/462.09 |
| 5,329,105 A * | 7/1994 | Lamoure | ................ | 235/462.16 |
| 5,337,362 A * | 8/1994 | Gormish et al. | ............... | 380/54 |
| 5,369,265 A * | 11/1994 | Adachi et al. | ......... | 235/462.15 |
| 5,378,881 A * | 1/1995 | Adachi | ................... | 235/462.09 |
| 5,477,042 A * | 12/1995 | Wang | ...................... | 235/462.1 |
| 5,489,769 A * | 2/1996 | Kubo | .................... | 235/462.09 |
| 5,523,552 A * | 6/1996 | Shellhammer et al. | . | 235/462.09 |
| 5,591,956 A * | 1/1997 | Longacre, Jr. et al. | ...... | 235/494 |
| 5,612,524 A * | 3/1997 | Sant'Anselmo et al. | .... | 235/494 |
| 5,862,270 A * | 1/1999 | Lopresti et al. | ............. | 235/456 |
| 6,082,619 A * | 7/2000 | Ma et al. | ................ | 235/462.11 |
| 6,115,508 A * | 9/2000 | Lopresti et al. | ............. | 235/456 |
| 6,456,798 B1* | 9/2002 | Keech et al. | ................ | 235/494 |
| 6,565,003 B1* | 5/2003 | Ma | ........................ | 235/462.11 |
| 6,802,450 B1* | 10/2004 | Cheung et al. | ......... | 235/462.25 |
| 2002/0036704 A1* | 3/2002 | Kim et al. | ................ | 348/390.1 |
| 2002/0044689 A1* | 4/2002 | Roustaei et al. | ............ | 382/199 |
| 2002/0088865 A1* | 7/2002 | He et al. | ..................... | 235/494 |
| 2003/0009725 A1* | 1/2003 | Reichenbach | ............... | 714/804 |

FOREIGN PATENT DOCUMENTS

GB          2388230 A    * 11/2003
JP      2004070960 A    *  3/2004

\* cited by examiner

*Primary Examiner*—Thien M. Le
*Assistant Examiner*—Uyen-Chau N. Le
(74) *Attorney, Agent, or Firm*—Joe Zheng; Roger Chu

(57) ABSTRACT

Methods and systems for encoding and decoding a 2D symbol is disclosed. According to one aspect of the 2D symbol, the following characteristics are realized: 1) variable symbol widths and height; 2) variable print resolution, 3) multiple damage protection levels; 4) large information storage; 5) high redundancy; 6) readable by line based scanning devices; 7) recognizable by either contact scanning or non-contact scanning devices. In addition, a set of positioning lines are attached 2D symbol for guiding scanning devices to decode the 2D symbol with proper resolution.

29 Claims, 24 Drawing Sheets

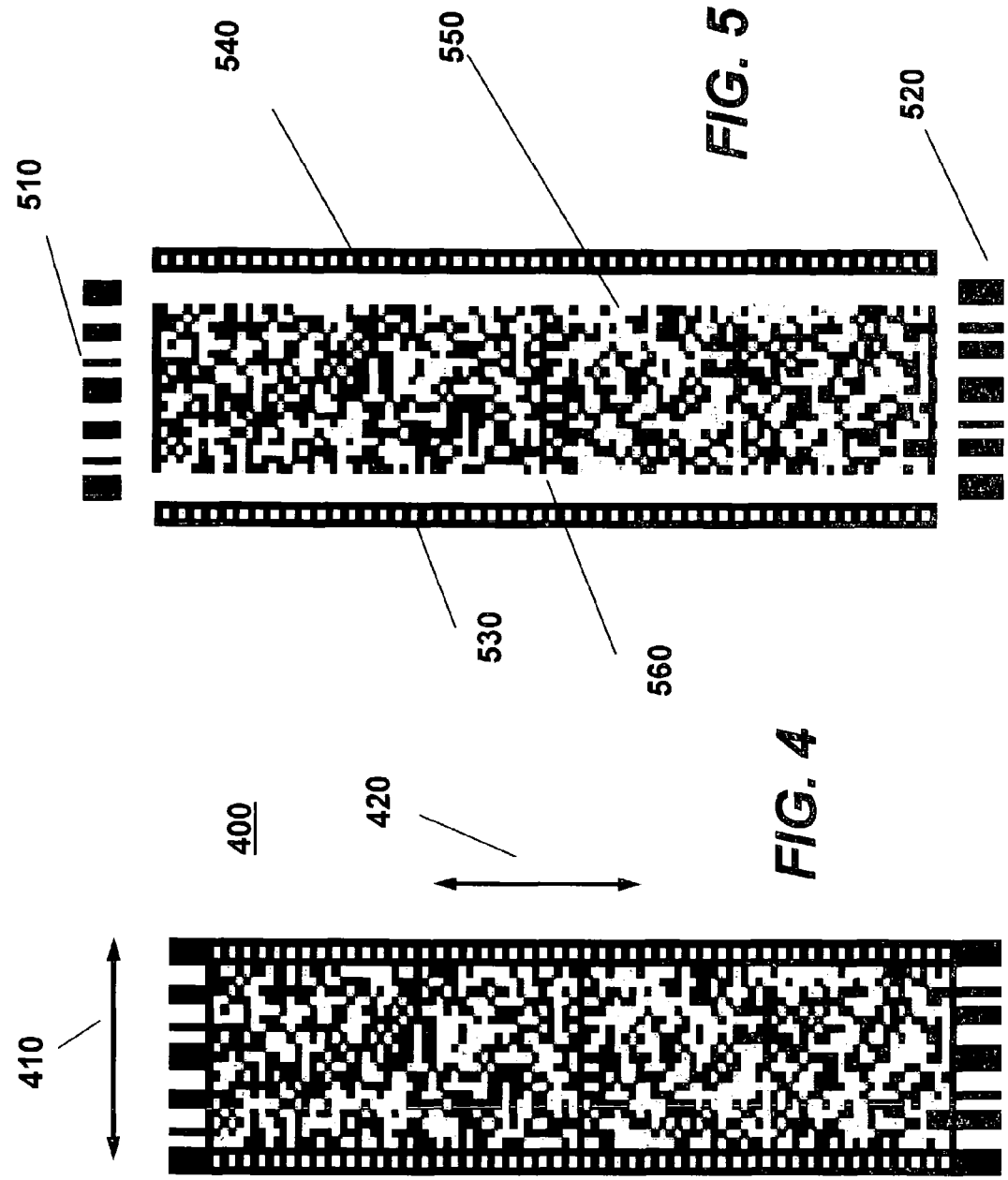

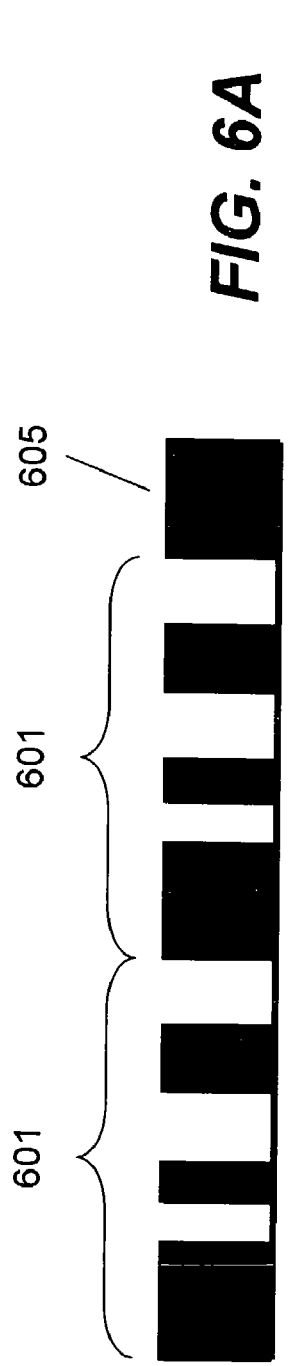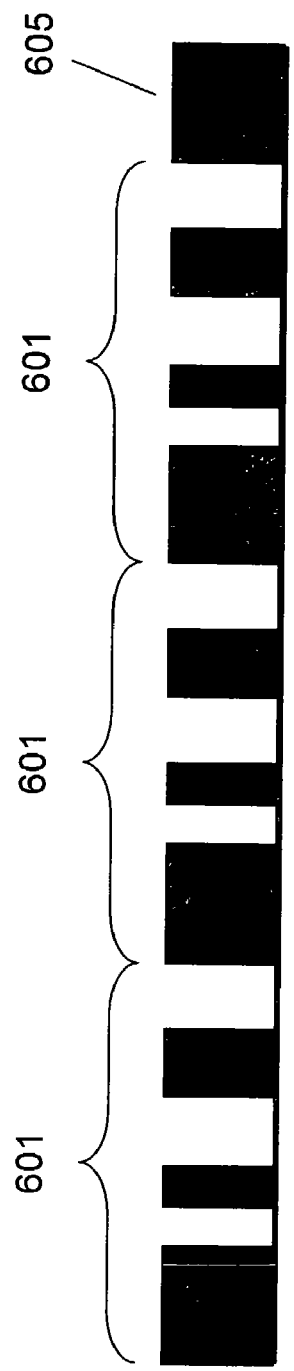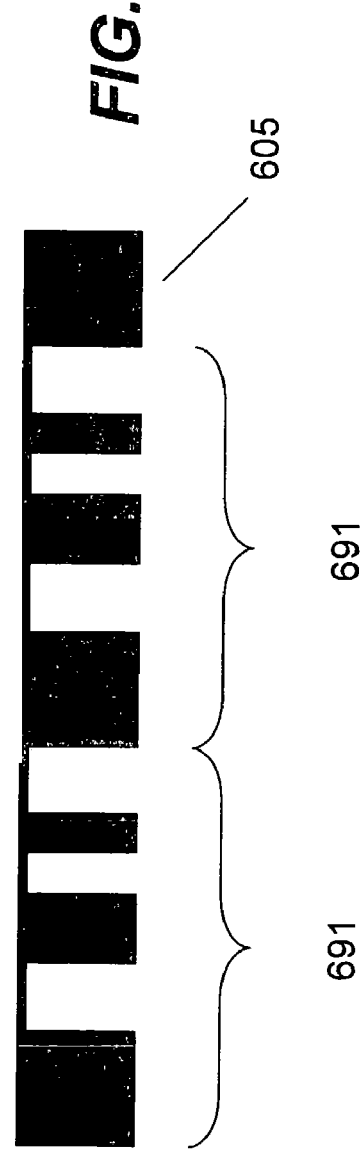

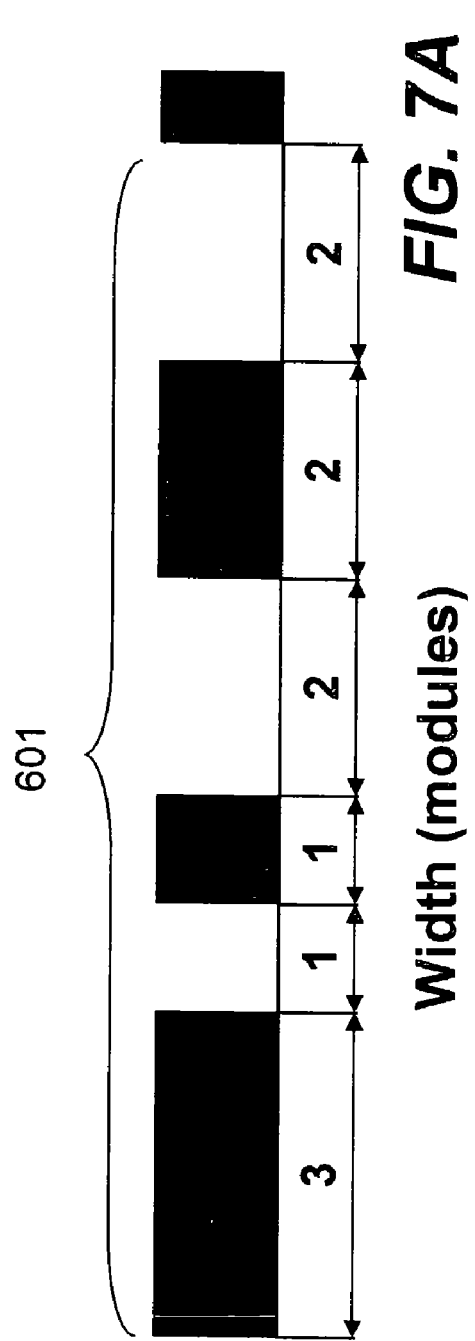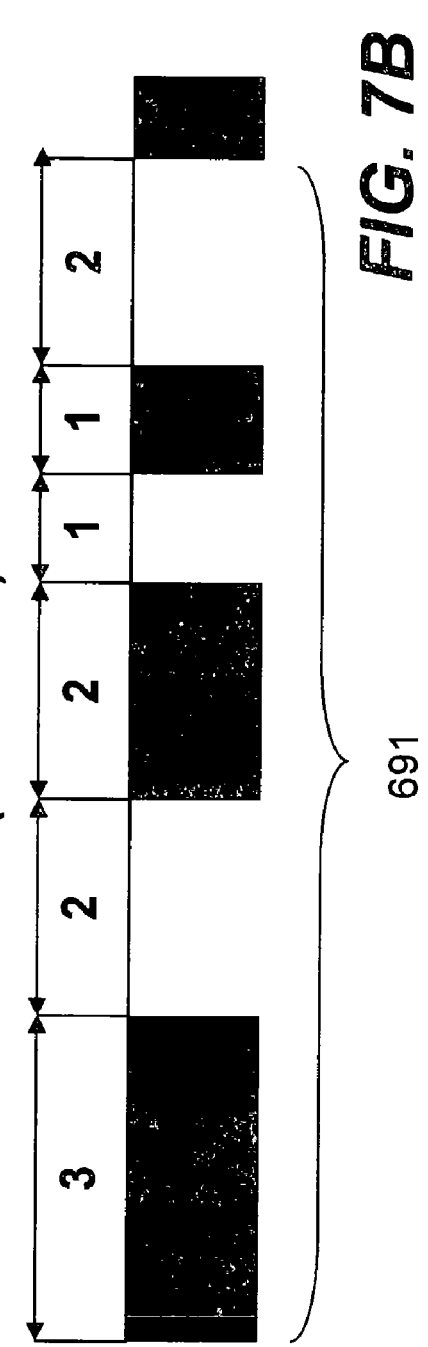

| Error Correction Level | Data Codeword | Error Correction Codeword | Max. Allowable Error |
|---|---|---|---|
| 1 | 119 | 8 | 4 |
| 2 | 111 | 16 | 8 |
| 3 | 95 | 32 | 16 |
| 4 | 63 | 64 | 32 |

*FIG. 8*

| A1 | A2 | A3 | ...... | A127 |
|----|----|----|--------|------|

| B1 | B2 | B3 | ...... | B127 |
|----|----|----|--------|------|

| C1 | C2 | C3 | ...... | C127 |
|----|----|----|--------|------|

| A1 | B1 | C1 | A2 | B2 | C2 | ...... | A127 | B127 | C127 |
|----|----|----|----|----|----|--------|------|------|------|

*FIG. 9A*

| a4 | a3 | a2 | a1 | a0 | e0 | e1 | e2 | e3 | e4 | e5 | e6 | e7 | e8 | e9 |
|----|----|----|----|----|----|----|----|----|----|----|----|----|----|----|
| b4 | b3 | b2 | b1 | b0 | e0 | e1 | e2 | e3 | e4 | e5 | e6 | e7 | e8 | e9 |
| c4 | c3 | c2 | c1 | c0 | e0 | e1 | e2 | e3 | e4 | e5 | e6 | e7 | e8 | e9 |

*FIG. 9B*

| A3 | A2 | B3 | B2 | D3 | D2 | E3 | E2 | G3 | G2 | H3 | H2 | J3 | J2 | K3 | K2 | M3 | M2 | N3 | N2 |
|----|----|----|----|----|----|----|----|----|----|----|----|----|----|----|----|----|----|----|----|
| A1 | A0 | B1 | B0 | D1 | D0 | E1 | E0 | G1 | G0 | H1 | H0 | J1 | J0 | K1 | K0 | M1 | M0 | N1 | N0 |
| C3 | C2 | C1 | C0 | F3 | F2 | F1 | F0 | I3 | I2 | I1 | I0 | L3 | L2 | L1 | L0 | O3 | O2 | O1 | O0 |

*FIG. 9C*

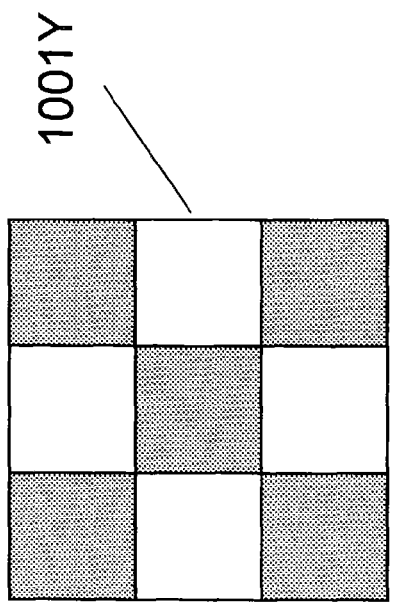
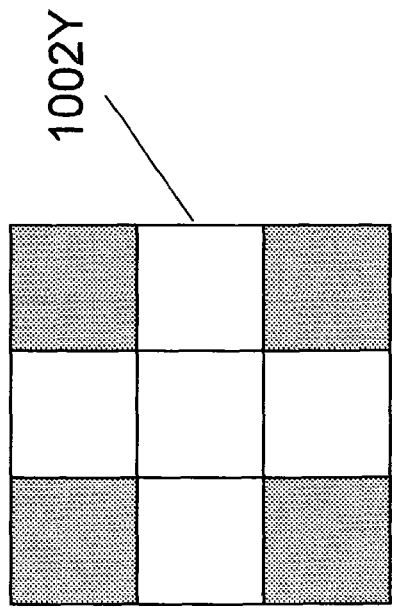
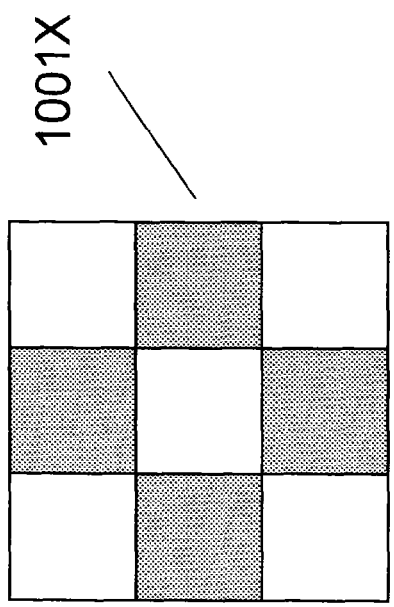
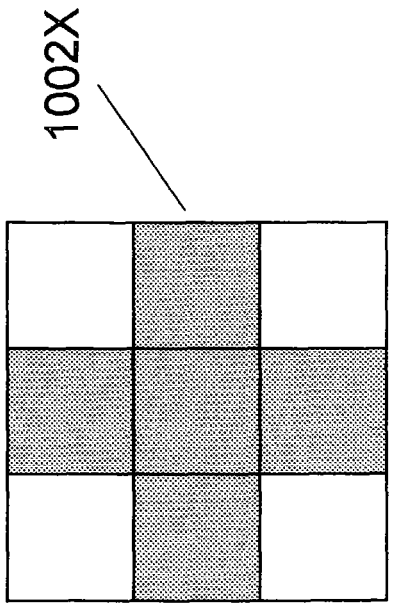
*FIG. 10A.1*
*FIG. 10A.2*

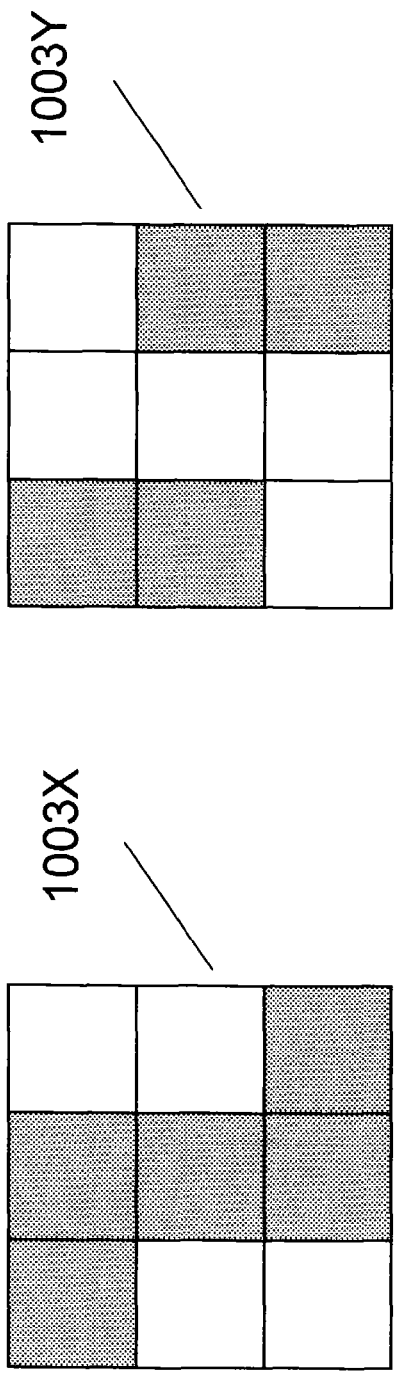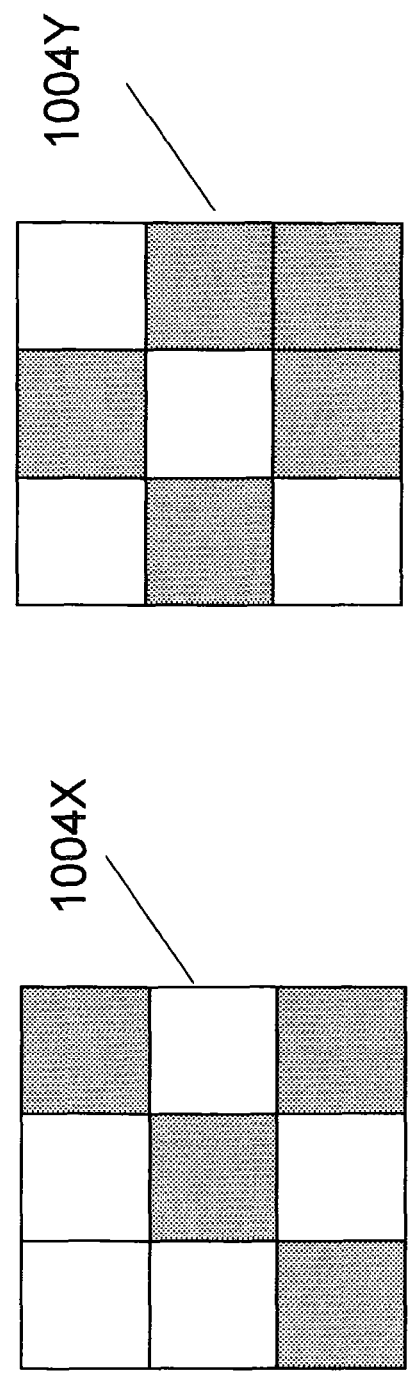
FIG. 10A.3
FIG. 10A.4

| Y | X | Y | X |
|---|---|---|---|
| X | Y | X | Y |
| Y | X | Y | X |
| X | Y | X | Y |
| Y | X | Y | X |

FIG. 10B

| 8 | 12 | 408 pixels | 12 | 8 |

FIG. 18

METHODS AND SYSTEMS FOR ENCODING AND DECODING DATA IN 2D SYMBOLOGY

BACKGROUND OF THE INVENTION

1. Field of the Invention

The present invention generally relates to optically encoded symbologies, and more particularly relates to methods and systems for encoding and decoding data into a two-dimension symbology.

2. Description of the Related Art

In today's high-technology world, more and more operations are performed automatically by computers. This increasing demand for automation has created strong demands for new technologies. Bar-code is one of the technologies used for automating data entry.

A bar-code symbol is a pattern containing a series of bars of various widths and spaced apart from one another by spaces of various widths, the bars and spaces have different light reflective properties representing strings of binary ones and zeros. Bar-code symbols are printed directly on a substance or on labels attached to the object. The bar-code symbols are typically read by optical techniques, such as laser beams, Charge-Coupled. Device (CCD) or Contact Image Sensor (CIS) cameras. A typical laser-based bar-code reader uses a photo-sensor to convert bars and spaces into an electrical signal as it moves across a bar-code. The reader then measures the relative widths of bars and spaces, translates the different pattern back into regular characters, and spends them on to a computer or portable terminal for further processing. There is a minimum width for these bars and spaces to be decoded properly by scanners. The minimum width is called a "unit" or "module". The spaces and bars are multiples of the "unit" or "module".

The conventional bar-code described above is one-dimensional. The information encoded in one-dimension (1D) bar-code is represented only by the widths of bars and spaces, which extends in a single dimension. All the bars and spaces have a uniform height in their vertical direction, thus the information only stored in the horizontal direction of a 1D bar-code. Generally a 1D bar-code is widely used as indices to associate physical objects with larger database containing detailed information. Because of the single dimension, 1D bar-code can only store very limited amount of information, for example, a zip code, a social security number or a serial number.

As the demand for information technologies grows, there is a strong interest in eliminating the associated database and storing more information into the symbology itself. As a result of this demand, the two-dimensional (2D) bar-code technologies have emerged from the extension of the 1D bar-code. The 2D bar-code symbologies are generally square or rectangular patterns that encode data in two dimensions. They fall into two general categories: "stacked bar-code" is constructed like a layer cake of 1D bar-code stacked one on top of another; "matrix bar-code" is built on a true two dimensional matrix.

One of the most commonly used "stacked bar-code" is PDF417 as shown in FIG. 1A. The detailed descriptions of PDF417 can be found in U.S. Pat. No. 5,304,786. PDF417 contains a number of code segments. Each consists of 4 bars and 4 spaces with total width of 17 modules, hence the name PDF417. It has a high tolerance for damaged symbology when high level of error correction is built in the symbol. Theoretically PDF417 can store up to 2000 characters per symbol, however the practical limit is no more than 350 characters. It is required to print PDF symbol with high resolution printer such as laser or thermal transfer printers. PDF417 can be read by cameras (CCD or CMOS), and a modified handheld laser or CIS scanner.

QR Code (Quick Response Code) is an example of a "matrix bar-code" developed by Nippondenso ID Systems. As shown in FIG. 1B, a QR Code symbol is square in shape and can easily be identified by its finder pattern of nested alternating dark and light squares at three corners of the symbol. Due to the finder pattern, a QR Code symbol can be read very rapidly with CCD array cameras. The drawback is the size, which is 177 modules squared, maximum. The corresponding maximum storage capacity is 2956 bytes with encoded with 750 bytes lowest level error correction code.

Scanners based on CCD or CIS cameras are particularly suitable for reading a 2D bar-code. Generally, scanners convert light (which human can see) into 0s and 1s (which a computer can process). In other words, scanners convert data from analogue format into digital format. All scanners work on the same principle of reflectance or transmission. A scanning object to be scanned is placed before a scanner which comprises a light source and a sensor. The amount of light reflected by or transmitted through the scanning object is picked up by the sensor and then converted to a signal proportional to the light intensity.

One of the factors affecting the scanner performance is the scan resolution. The scan resolution relates to the fineness of detail that a scanner can achieve, and is usually measured in dots per inch (dpi). The more dots per inch a scanner can resolve, the more detail the resulting image will have. A scanner typically has a photoelement for each pixel. A scanner claiming a horizontal optical resolution of 600 dpi is alternatively referred to as 600 pixels per inch (ppi), and this is also referred as scanner's x-direction resolution. For a scanner having a maximum scanning width of 8.5 inches, there is an array of 5100 photoelements in the scan head. The scan head is mounted on a transport which is moved across a scanning object. Although the process may appear to be a continuous movement, the head moves a fraction of an inch at a time, taking a reading between each movement. The number of physical elements in a sensor array determines the horizontal sampling rate and the number of steps per inch determines the vertical sampling rate, which is referred as scanner's y-direction resolution. The scanners resolution is based on its x-direction and y-direction resolutions.

It would be desirable to have a new 2D bar-code with following characteristics storing much more information, built-in redundancy, multiple levels of damage protection, flexible width and length symbol, and allowing hand-held line-based contact or non-contact scanning.

With proliferation of hand operating a scanning devices, it is preferred to scan a 2D bar-code with hand-held scanners. However, there exist a few problems. A phenomena known as the loss of vertical synchronization 200 in scanning 2D bar-code symbols due to the limited height of elements is shown in FIG. 2. A 2D bar-code 210 is overlapped with a set of parallel scan lines 220. Generally, the angle between scan line 220 and the horizontal axis of the bar-code 210 is non-zero for a hand-held scanning device. Due to the limited height of bar-code elements, certain scan lines 230 cut across two rows of bar-code elements. As a result, these scan lines 230 are not useful. It would be desirable to have a method to decode the 2D bar-code avoiding the loss of synchronization problem. It would also be desirable to decode the 2D bar-code efficiently and effectively.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to processes, methods, systems and software products to encoding and decoding of a 2D bar-code. In one aspect of the present invention, a new 2D bar-code symbology is presented with at least the following features: 1) variable symbol width and height; 2) variable print resolution; 3) multiple damage protection levels; 4) large information storage; 5) high redundancy; 6) readable by line based scanning devices; and 7) recognizable by either contact scanning or non-contact scanning devices.

According to one embodiment, a 2D bar-code comprises a top border, a bottom border, a left border, a right border, a bit-stream data area and a plurality of data segment dividers. The unique pattern of the top and the bottom border is used for guiding scanning device to recognize the orientation of a 2D bar-code, whether the bar-code is upside down or flipped mirror image. A plurality of corresponding pair of positioning holes on the left and the right border are used for a scanning device to calculate the coordinates of data elements. The bit-stream data area contains bar-code information in the form of ordered rows of 9-bit "codeword", which has a data structure of 3 rows by 3 columns of data elements as shown in FIG. 3. The order of bits is stored in row major from left to right, then top to bottom.

The width and length of a 2D bar-code is controlled by the amount of information carried in the bit-stream data area. A number of measures to protect against physical damage are employed in 2D bar-code. The first measure is to divide the data bit-stream into a number of equal size data segments. A set of data segment control information is added to each data segment. As a result, redundancy is provided by repeating the critical control information related to the entire bar-code in each data segment.

One of the measures is to employ an industry standard error correction method (e g., Reed Solomon function) in each data segment. So even a portion of a bar-code is not recognizable, the error correction may be able to recreate the missing information with the error correction codeword located in the intact portion of the bar-code. There are a number of different levels of error correction. Depending upon the applicable circumstance, a suitable level of error correction may be chosen. Ensuring higher confidence for decoding, an independent error correction scheme is employed for the data segment control information. Instead of storing codewords in sequential order, codewords are stored in an interleaved order, so the contiguous data is spread out in a larger area. As a result, the chance of damage to contiguous data decreases, while increasing the chance to recreate damage data via error correction.

When a large concentration of bars (dark color) in one particular portion of a bar-code occurs, the scanning device may not catch the few white spaces in this concentration. To protect against this problem, a masking or bitwise-XOR operation is performed between the bit-stream of codeword data and a predefined mask to hide some of the concentrated bars.

In another aspect of the present invention, different decoding methods are also disclosed. One of the Methods is used to decode the 2D bar-code after the entire 2D bar code symbol is scanned and stored. Another one of the methods is used for decoding the 2D bar-code while the 2D bar-code is being scanned. According to one embodiment, these decoding methods are incorporated as a software product loaded on a scanning device for decoding the 2D bar-code efficiently and effectively.

In still another aspect of the present invention, a set of equally spaced parallel positioning lines is attached to a 2D bar-code. These positioning lines are used for guiding the scanning device to decode the 2D bar-code properly.

In still yet another aspect of the present invention, the 2D bar-code may be divided by visible marks corresponding to different paragraphs of an article.

One of the objects, features, and advantages of the present invention is to provide a symbology with flexible features and suitable for scanning.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIG. 4 is an example of a 2D bar-code from the present invention.

FIG. 5 is a dissected view of the 2D bar-code, in FIG. 4.

FIGS. 6A–C show exemplary patterns of top border and bottom border.

FIG. 7A and 7C, depict the details of two exemplary starting code of the top border.

FIG. 7B and 7D depict the details of two exemplary ending code of the bottom border.

FIG. 8 is a table showing exemplary combinations between error correction codeword and data codeword at different error correction levels.

FIG. 9A lists the interleaved storage scheme for a bit-stream of codeword data.

FIG. 9B shows one embodiment of the data structure of data segment control information.

FIG. 9C shows another embodiment of the data structure of data segment control information.

FIGS. 10A.1, 10A.2, 10A.3 and 10A.4 display four pairs of predefined mask patterns used in one embodiment of the present invention.

FIG. 10B shows an interleaf scheme similar to a chessboard for creating a predefined mask for a bar-code.

FIG. 18 shows a schematic chart of a scanner head corresponds to the 2D bar-code.

DETAILED DESCRIPTION OF THE PREFERRED EMBODIMENTS

In the following description, numerous specific details are set forth in order to provide a thorough understanding of the present invention. However, fit will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or an "embodiment" means that a particular feature structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
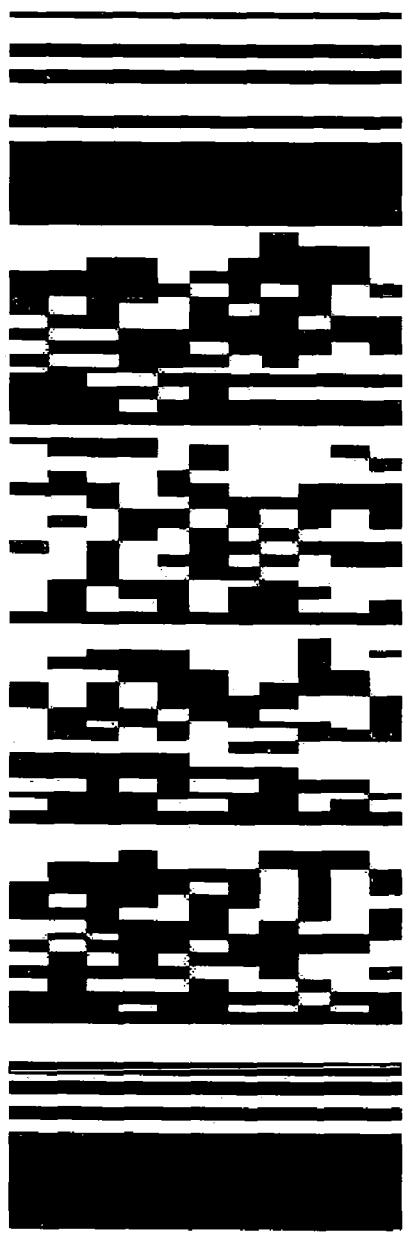
FIG. 1A shows an example of a PDF417 2D bar-code
Figure 1B:
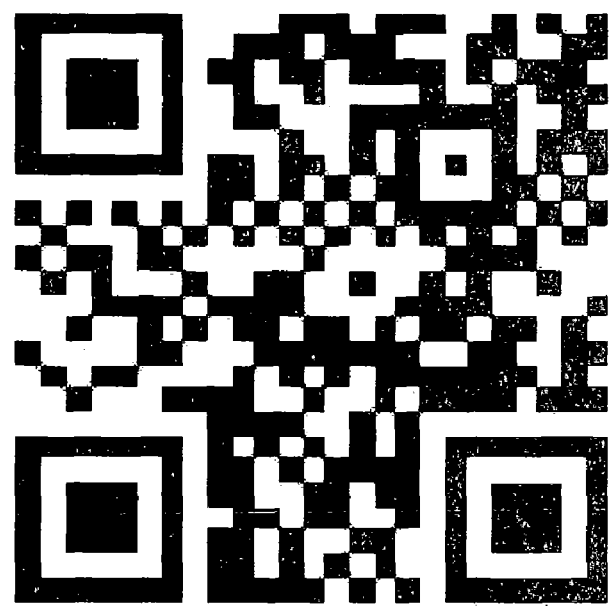
FIG. 1B illustrates an example of a QR Code.
Figure 2:
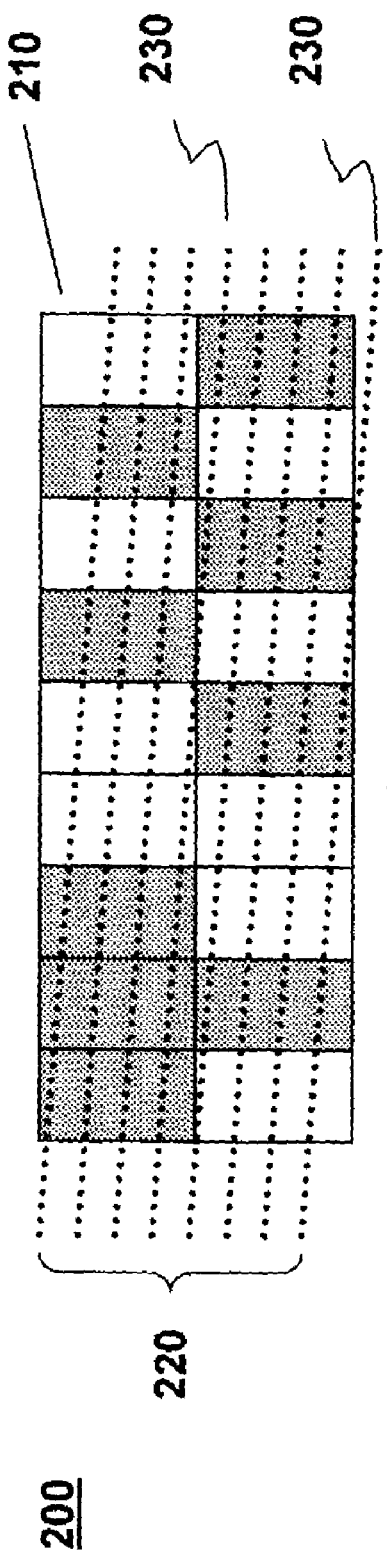
FIG. 2 is a diagram illustrating the intersection of scan lines with rows of 2D bar-code elements.
Figure 3:
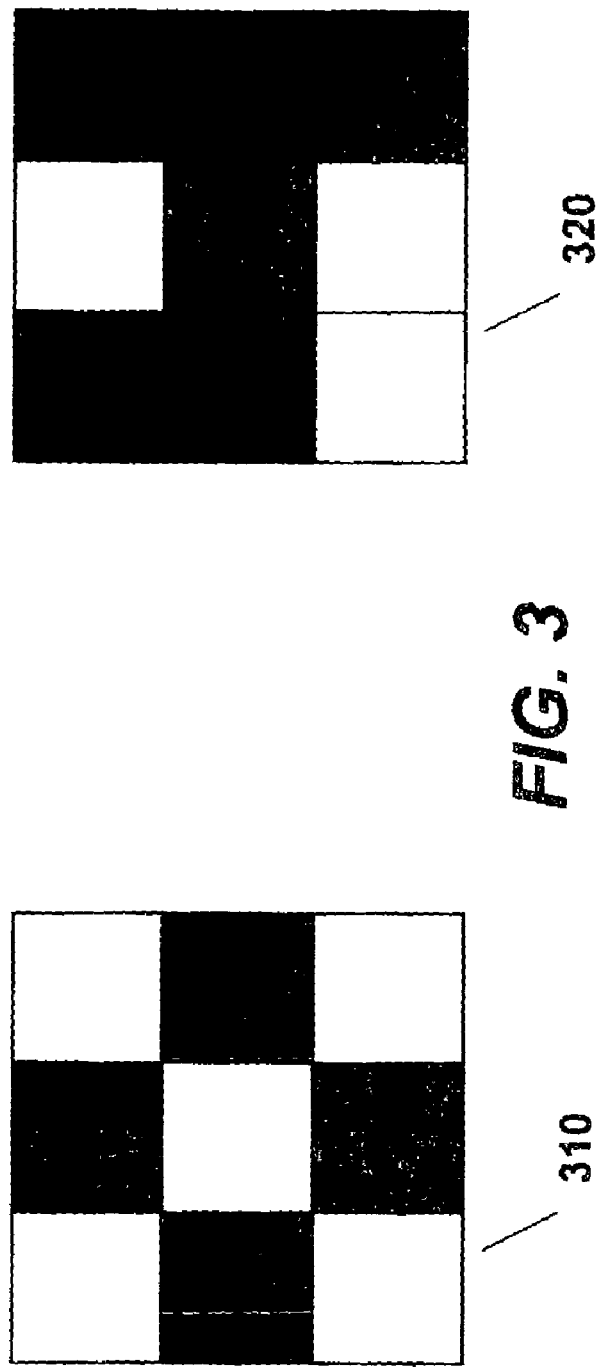
FIG. 3 displays two examples of 9-bit code word from the present invention.

Referring now to the drawings, in which like numerals refer to like parts throughout the several views. FIG. 3 shows two examples of the data structure used in the 2D bar-code in the present invention. Each 9-bit codeword includes data element arranged in 3 rows by 3 columns, each data element is either a dark colored or light colored. Each data element stores one bit of information. The order of the codeword is from left to right and top to bottom. To facilitate the description of the present invention, the dark or light colored element is referred to as a bar or a space. In one embodiment, the bar represents 1, and the space represents 0. As an example, the value of the codeword 310 is 010101010 in binary or 0×0aa in hexadecimal, and the codeword 320 is 101111001 in binary or 0×179 in hexadecimal.

According to one embodiment of the present invention, FIG. 4. illustrates a rectangular 2D bar-code symbol 400 including a plurality of rectangular bar-code elements in bars and spaces. The rectangular bar-code symbol 400 has two major axes horizontal axis 410 and vertical axis 420. A dissected view of the 2D bar-code symbol 400 is shown in FIG. 5. The components of the 2D bar code symbol 400 include a top border 510, a bottom border 520, a left border 530, a right border 540, a bit-stream data area 550 and a plurality of data segment dividers 560. The 2D bar-code data are stored in the form of bit-stream of codeword data. The bit-stream of codeword data contains a set of ordered rows of 9-bit codeword. The bit-stream area 550 is divided into a number of data segments separated by data segment dividers 560.

Two exemplary top borders 510 are shown in FIGS. 6A and 6B. The top border comprises two basic components start code pattern 601 and terminator code pattern 605. An exemplary top border includes two start code patterns 601 and one terminator code pattern 605 as shown in FIG. 6A. FIG. 6B shows another exemplary top border that contains three start code patterns 601. The number of start code pattern 601 varies depending on the amount of data carried in the 2D bar-code. The minimum number of the start code pattern 601 is one. And there is no theoretical maximum limit for start code pattern 601, however, the practical limit may be controlled by the width of a carrier (e.g., the width of paper). With a similar design, the bottom border 520 contains at one end code pattern 691 and one terminator code pattern 605. An exemplary bottom block 520 is illustrated in FIG. 6C. The terminator code pattern 605 contains one 3-module wide bar.

Both of the start code pattern 601 and the end code pattern 691 are directional. The start code pattern 601 has a construct of 6 alternated bars and spaces with a distinct combination of widths. The end code pattern 691 has a similar construct with a different combination of widths. The width of the six components is as follows 3:1:1:2:2:2 modules for the start code pattern 601 as displayed in FIG. 7A. FIG. 7B shows the width of the end code pattern 691 as follows: 3:2:2:1:1:2 modules for bars and spaces. Therefore, the total width of the bar-code is the sum of all the start/end code patterns and terminator code pattern.

$$W=11*N+3 \text{ modules}$$

Where: W is the width of a bar-code; and

N is the number of repeating start/end code patterns in the bar-code.

Figure 7C:
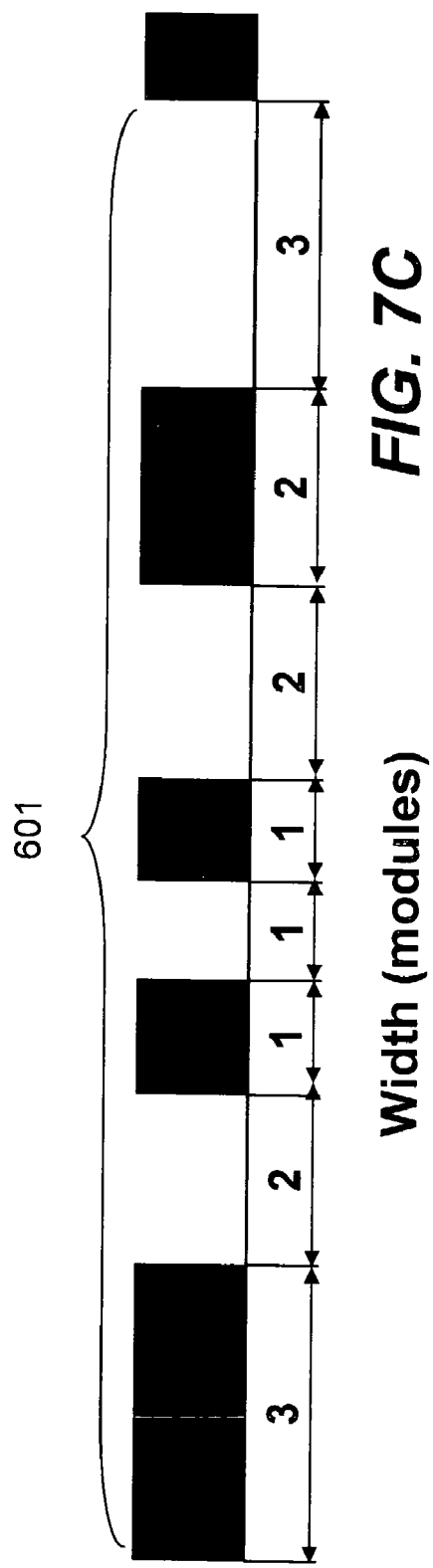
Figure 7D:
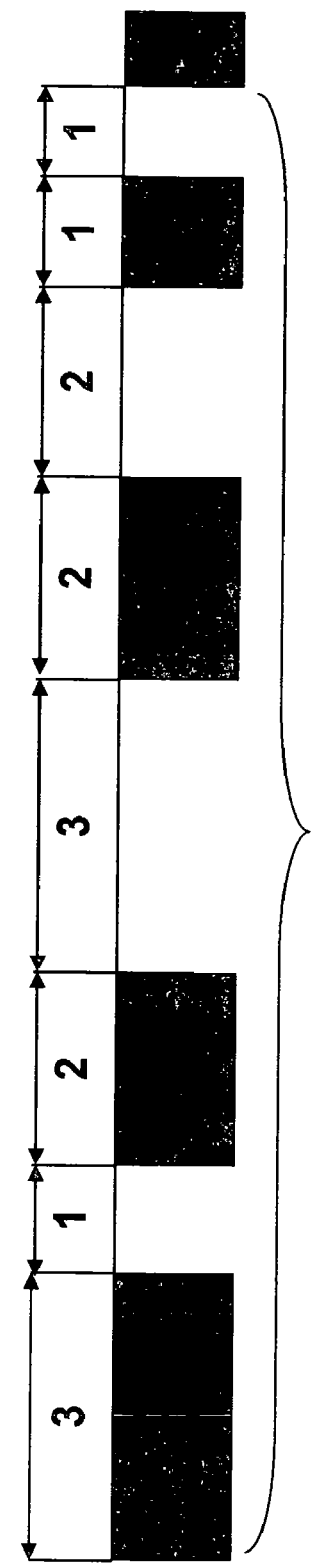

Another embodiment of start code pattern and end code pattern is illustrated in FIG. 7C and FIG. 7D. They are constructed by 8 alternated bars and spaces with a distinct combination of widths. The width of eight components is 3:2:1:1:1:2:2:3 modules for the start code pattern, which is displayed in FIG. 7C. FIG. 7D shows the width ratio of the end code pattern as: 3:1:2.3:2:2:1:1 modules for bas and spaces. In this embodiment, the total width of the bar-code is calculated as follows:

$$W=15*N+3 \text{ modules}$$

Where: W is the width of a bar-code; and

N is the number of repeating start/end code patterns in the bar-code.

Referring now back to FIG. 5, each of the left border 530 and right border 540 has an identical positioning block of a width of 3 modules and a length covering the height of the bar-code. When the boarder 530 or 540 is viewed as three columns, the two outside columns of the border are all bars and the middle column includes bars and spaces placed alternately in accordance with a predefined pattern. In one embodiment, the pattern is one bar to one space. In another embodiment, the pattern can be a number of bars interlacing with a number of spaces. Inherently, the alternating spaces in the left and right borders are provided for locating the data elements in between.

To increase the reliability of decoding the bar-code, the bit-stream data area 550 is divided into a number of equally sized data segments by a data segment divider 560, which is one row of bars spanning the entire width of the bar-code.

The Reed-Solomon error correction method is applied against physical damages to the bar-code symbology. In one embodiment of the present invention, several optional choices of the Reed-Solomon scheme may be employed to protect against damage of data elements. FIG. 8 shows an exemplary list of different levels of Reed-Solomon scheme for 127-codeword data. It is evident that the higher the error correction level, the lower the amount of data can be stored in a given bar-code. Selecting a suitable option depends on the physical environment in which bar-code is deployed. Error correction codewords are calculated based on the level of error correction scheme selected.

Most of the bar-code damage occurs in a concentrated area. One method for reducing the probability of the loss of continuous data is as follows: a) to divide the data segment into a number of groups of fixed length data block (e.g., 127-codeword); b) to store multiple groups in an interleaved order so the continuous codewords are not stored next to each other. An exemplary scheme to store three groups of 127-codeword data in a round-robin fashion is illustrated in FIG. 9A. The number of groups can be any positive numbers.

In addition to all the codeword data stored in thee bit-stream data area 550 of FIG. 5, a set of vital control information is added to each data segment to enhance the decoding reliability FIG. 9B show one embodiment of the control information data structure. Due to the importance of these control data, a separate high level of error correction code is used independent of the error correction scheme employed for the codeword data. In FIG. 9B, bits e0 to e9, represent the error correction code, bits a0, a1, a2, a3 and a4, represent the total number of data segments in the bar-code symbol; bits, b0 and b1, denote the selected error correction level; the bit b2 denotes the interleaf toggle, the bits, b3 and b4 denote the mask type; and bits, c0 to c4, represent the data segment number of the current data segment. FIG 9C shows another embodiment of the control information data structure. Bits A3, A2, A1, A0 and B3 represent the data segment number of current data segment; bits, B2, B1, B0, C3 and C2 represent the total number of data segments in the bar-code, symbol; bits C1, C0, and C3 denote the selected error correction level; bits D2 and D1 contain the mask type and bit D0 is interleaf toggle. In this embodiment, the control information data are first arranged into seven 3 by 3 codeword, then converted into bit-stream. 3 remaining data elements are filled with 0. The control information is redundantly repeated in each data segment to ensure the availability of the information even if the bar-code goes through the toughest physical abuses.

Figure 10B:
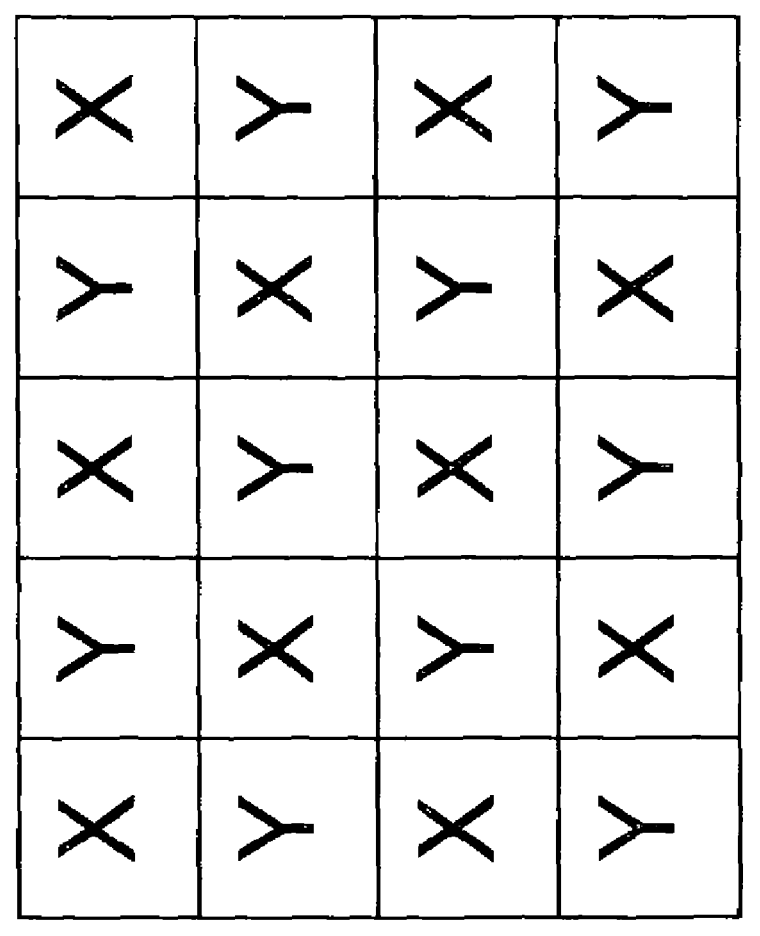
Figure 10C:
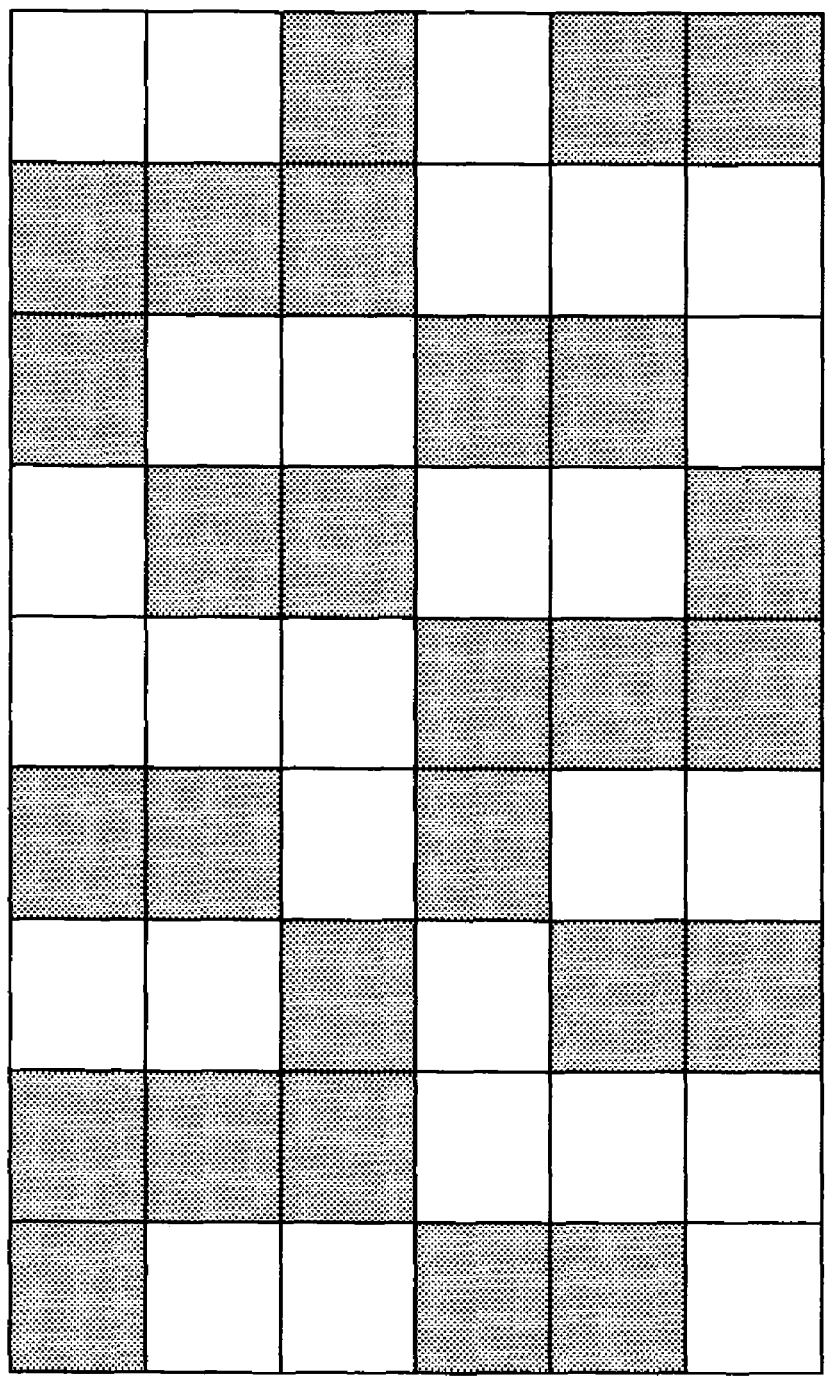
FIG. 10C shows an exemplary predefined mask.

When overwhelming numbers of bars (dark color) with only very few spaces (light color) concentrate in a particular portion of the 2D bar-code symbol, it may cause scanning devices to miss the spaces, resulting in incorrect information. To minimize such concentration of one color (either all bars or all spaces), in one embodiment of the present invention, a scheme is to mask the bars by applying masking or bitwise-XOR operations to the bit-stream codeword data with a predefined mask. The masking mechanism is different from the conventional one. It it based on 3 rows by 3 columns codeword. A predefined mask is constructed using one of the four distinct pairs of masking codewords. Each pair contains a set of X and Y patterns. Each of the X an Y patterns has 3 rows and 3 columns of data elements, the same size as that of a codeword. In FIG. 10A.1, they X pattern is indicated in 1001X and Y in 1001Y. 1002X and 1002Y are the second pair, 1003X and 1003Y are the third pair, and 1004X and 1004Y are the fourth pair as shown in FIGS. 10A.2 to 10A.4. To construct a predefined mask, the X pattern and Y pattern are placed in an interleaved order similar to a chessboard as illustrated in FIG. 10B. Using a pair of masking codewords 1003X and 1003Y, an exemplary predefined mask is constructed as shown in FIG. 10C.

Figure 11:
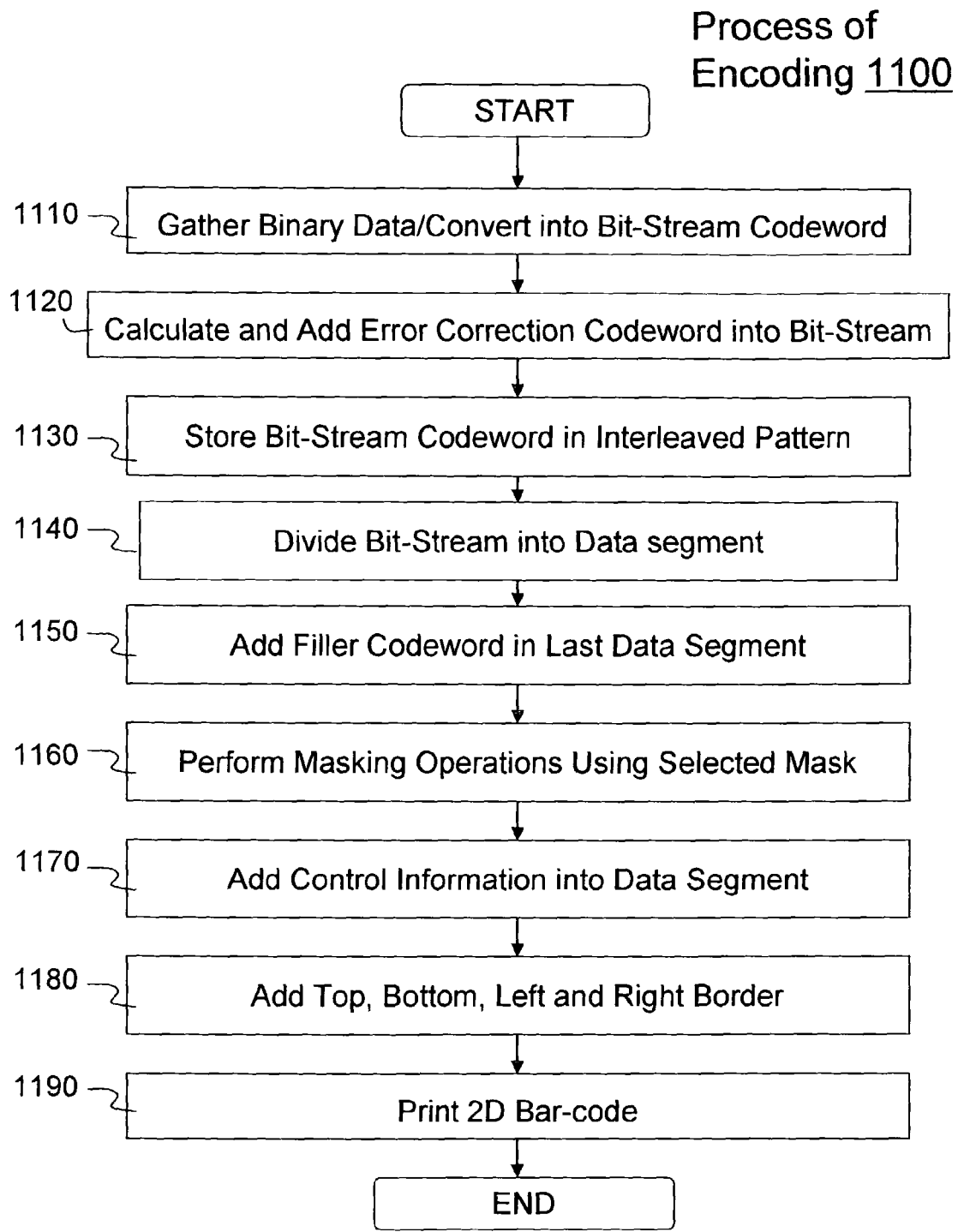
FIG. 11 shows a flow chart of a bar-code encoding method.

Referring now to FIG. 11, there shows a flowchart 1100 for encoding a 2D bar-code according to one embodiment of the present invention. First, a binary data file is converted into a binary bit-stream of codeword at 1110. Based upon a user selected error correction level, error correction codewords are calculated and then added into each bit-stream of codeword data (e.g, 127-codeword) at 1120. A group of these bit-stream codeword data may be stored in an interleaved order at 1130. At 1140 the entire bit-stream of codeword data is then divided into a number of data segments basing on the amount of information carried in the bar-code. To ensure all data segments have equal size, the filler codewords are appended to the last data segment if needed at 1150. Then at 1160, a masking or bitwise-XOR operation is applied on the bit-stream codeword data with a pre-selected mask to create a new bit-stream codeword of data. At 1170, the control information for each data-segment are first converted into codewords before added into the bit-stream of the data segment. At 1180, a top border, a bottom border, a left border and a right border are added. Finally the 2D bar-code is printed at 1190.

Figure 12A:
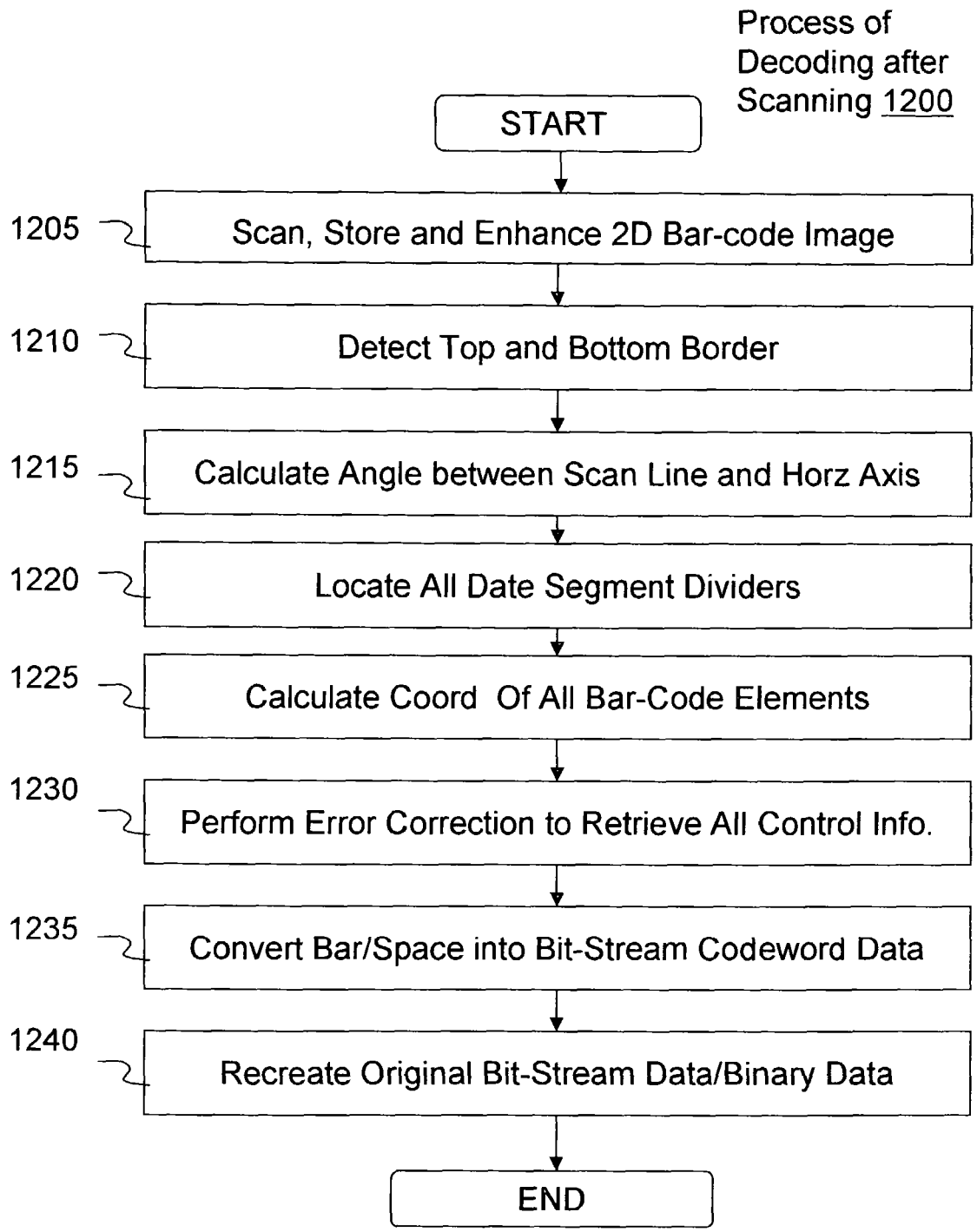
FIG. 12A shows a flow chart of a method to decode the 2D bar-code.

FIG. 12A shows, a flowchart or process 1200 for decoding a 2D bar-code in entirety. At 1205, the entire 2D bar-code symbol is scanned, stored in as a stored image, and then enhanced. At 1210, the top and bottom borders are detected and their corresponding coordinates are saved. At 1215, the angle between the scan line and the horizontal axis of the bar-code are determined. Based on the start and end code patterns, the stored bar-code image orientation (e.g., upside down or inside out) is determined, and the print resolution of the stored image are determined. The first data segment divider is located in the stored image at 1220. Using the first segment divider, bar-code print resolution, and a set of positioning holes on left and right border, the coordinates of all data elements in the bit-stream data area are calculated at 1225. At 1230, an error correction process on the control information is performed to extract the vital control information such as error correction level, mask type, interleaf toggle, total number of data segments and current data segment numbers. At 1235, the bit value (bar/space) of data elements in the bit-stream data area are then read according to their coordinates calculated in 1225 and restored into a bit-stream of codeword data. At 1240, the original bit-stream of codeword data is re-established with the operations of re-sequencing from an interleaved order, masking or bitwise-XOR, and error correction applying to the bit-stream created at 1235. Finally the bit-stream of codeword data is converted into the original binary data.

Figure 12B:
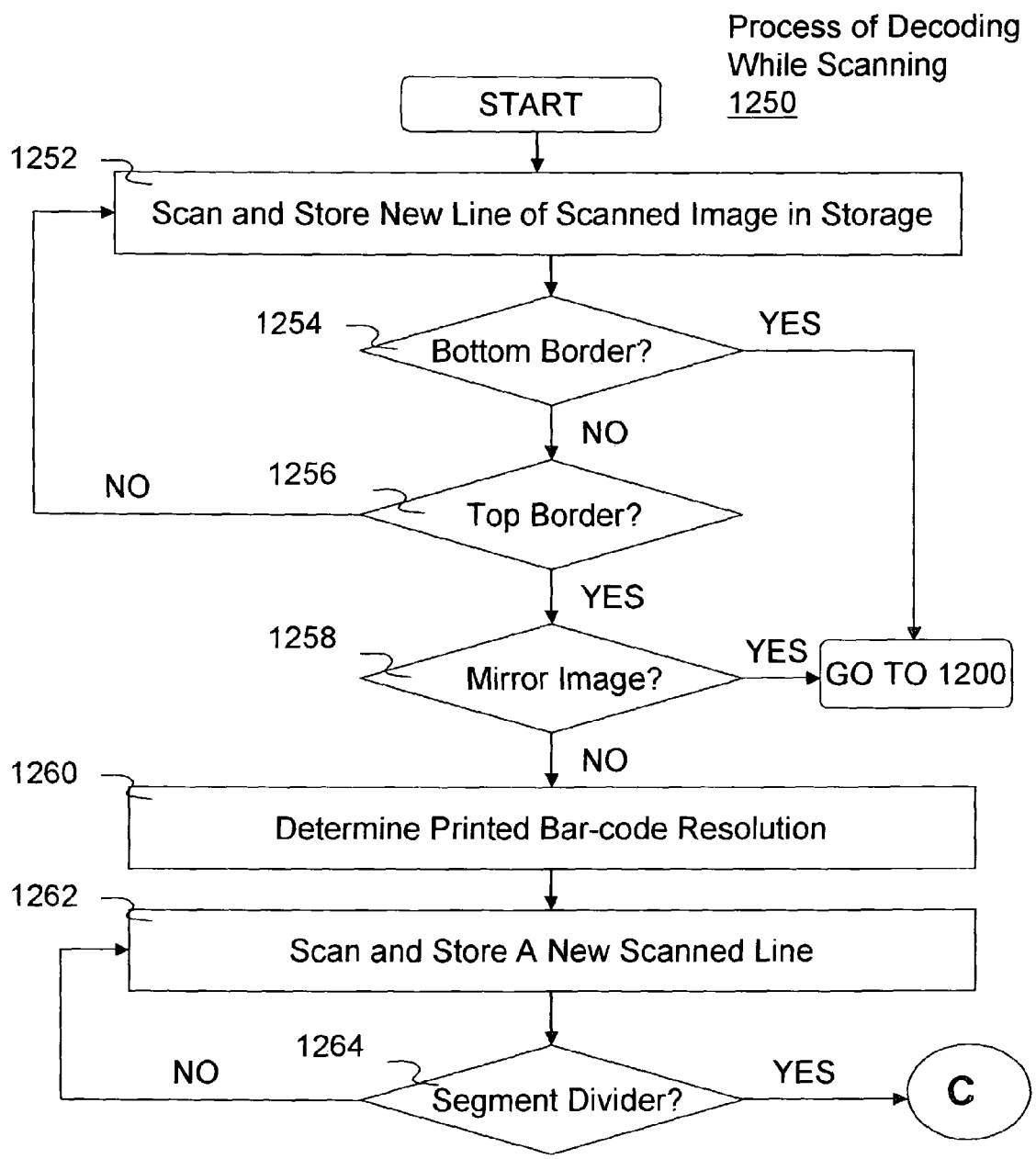
FIGS. 12B and 12C show a flow chart of a method to decode the 2D-bar-code without the requirement of scanning the 2D bar-code symbol first.
Figure 12C:
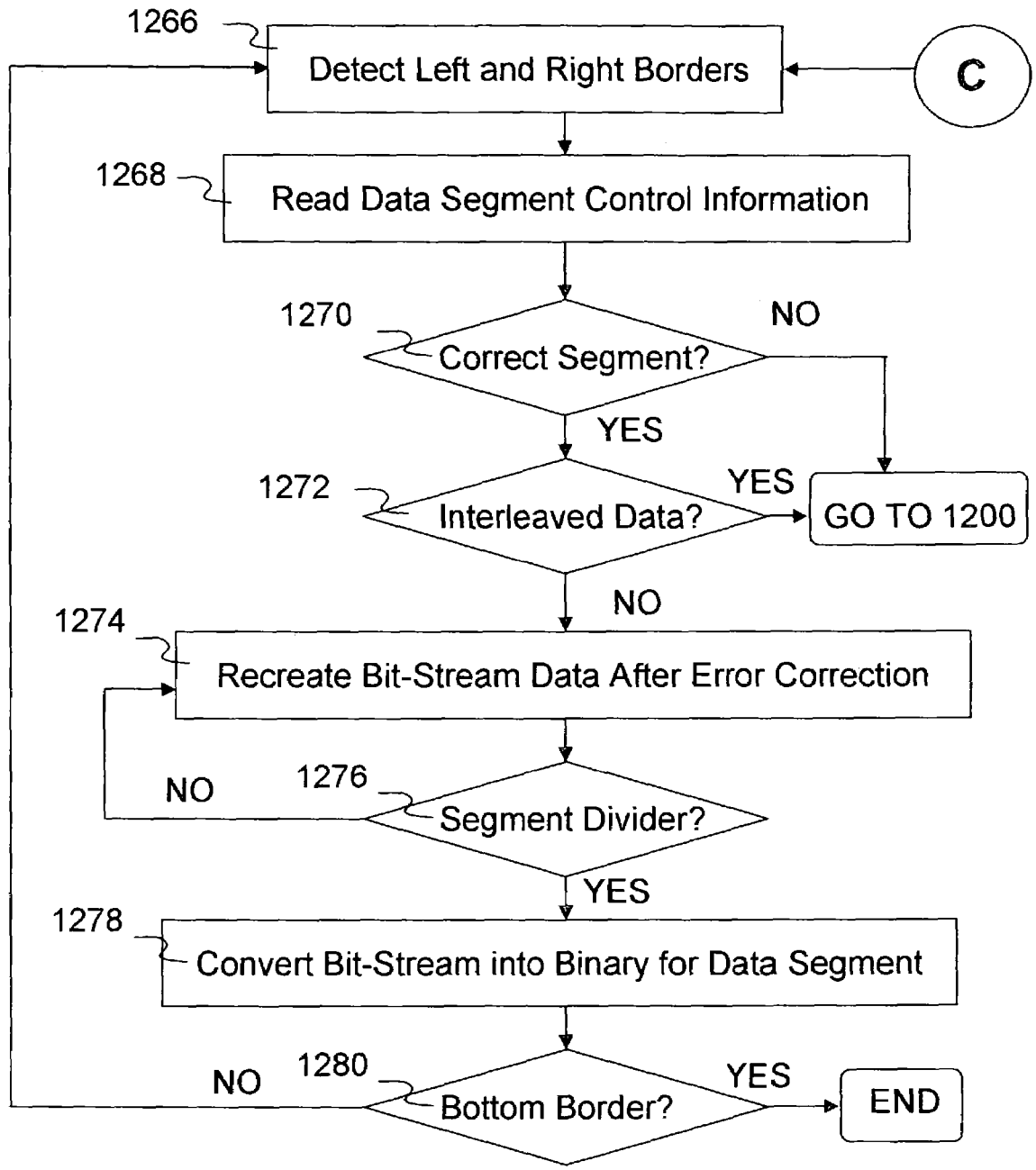

FIGS. 12B and 12C collectively show a flowchart or process 1250 of decoding a 2D bar-code according to another embodiment of the present invention. One of the, distinct features in this process is that the bar-code is decoded while being scanned. At 1252, the scanning device scans a new line of a 2D bar-code into a scanned image and stores in a temporary storage. At 1254, the scanned image is compared with the bottom border pattern. If there is a match, the 2D bar-code image to be scanned is upside down. The decoding can only be done with the 2D bar-code image in entirety as described in FIG. 12A. Otherwise, at 1256, the scanned image is compared with the top border pattern. If they do not match, the process goes back to step 1252 for another scanned image. When the top border is found, the next step 1258 is to determine whether the 2D bar-code is a mirror image. If it is a mirror image, the decoding can only be done with the method in FIG. 12A. Next, at 1260, the print resolution the 2D bar-code symbol is determined. At 1262, scanning device moves on for another line of scanned image based on the printed solution.

At 1264, a test is to determine whether the scanned image is a data segment divider, which is a solid bar across the width of a 2D bar-code. If not, the process goes back to step 1262 for another new line of scanned image. Otherwise, the process starts to decode the bit-stream of codeword data carried in the 2D bar-code. At 1266, the corresponding positioning holes of the left and right borders are detected. A set of control information is then read with the guide of the positioning holes and data segment divider at 1268. Control information such as total number of data segments, error correction level, interleaf toggle, mask type and current segment number are extracted after error correction is operated on the control information portion of the bit-stream of codeword data.

At 1270, the test makes sure that the correct data segment is being decoded while scanning. If not, the process goes to the process 1200 for decoding the 2D bar-code symbol in entirety. At 1272, interleaved data storage order is checked. Again, the decoding must be performed with the method for decoding the 2D bar-code in entirety if the bit-stream codeword of data is stored in interleaved order. After passing both tests, at 1274, one row of data elements is read in. The process continues by testing whether the next line of scanned image is a data segment divider at step 1276. If not, the process goes back to step at 1274. Otherwise the original bit-stream codeword of data for the current data segment is finally restored after performing selected error correction at 1278. At 1280 a final test is performed. If the bottom border has not been detected in the next line of the scanned image, a new data segment is decoded with the repeating steps 1266–1280. Otherwise, when bottom border is detected, the decoding is done.

Figure 13:
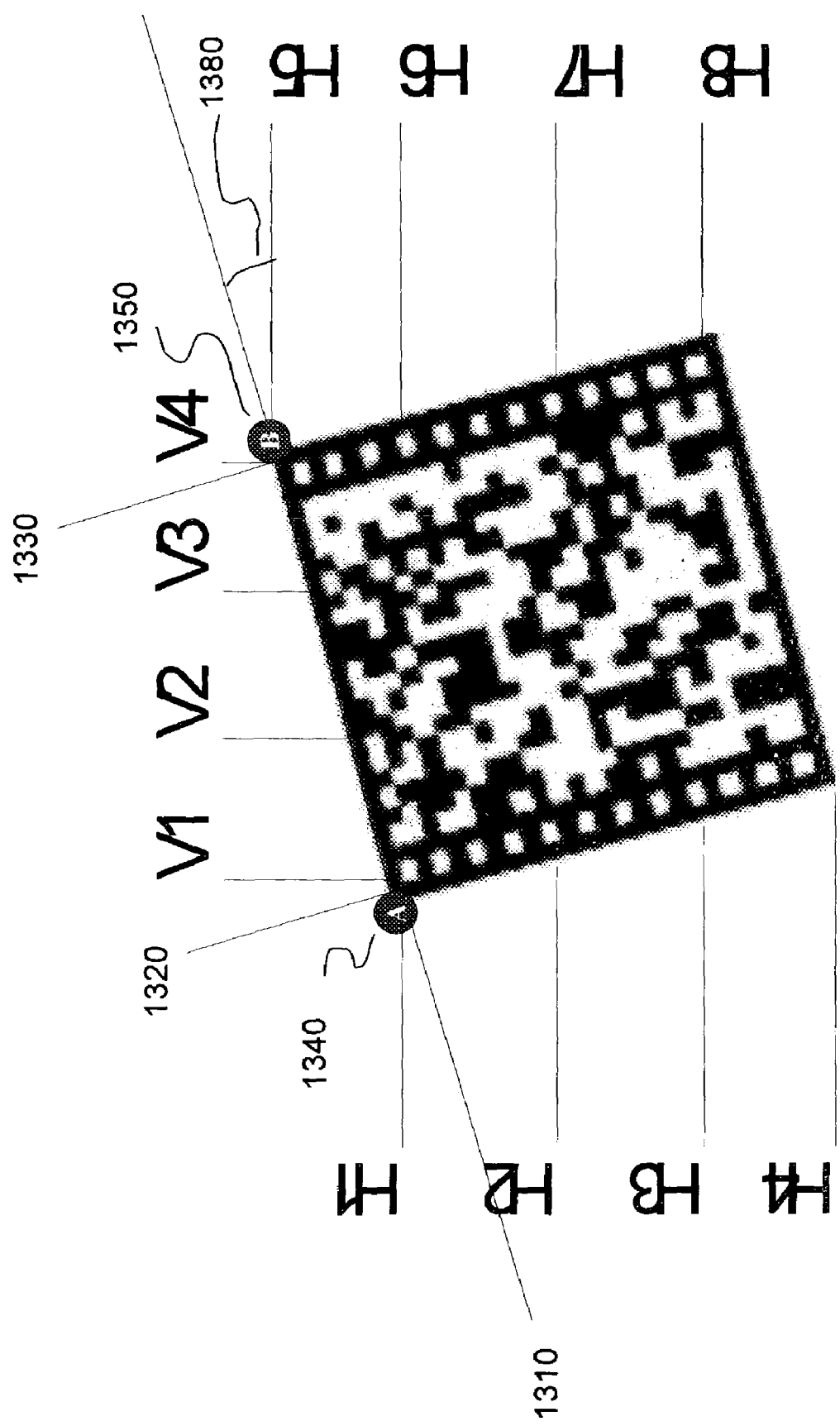
FIG. 13 shows a detailed view of locating the positioning holes.

Referring now to FIG. 13, a detailed geometry is illustrated to show the procedure for determining the coordinates of data elements of a 2D bar-code using a corresponding pair of positioning holes in the left and right border of a stored 2D bar-code image. A data segment divider 1310 is detected using four equally spaced vertical traces V1, V2, V3 and V4 in the vertical direction of the scanned image. The left border 1320 is detected with for four equally spaced horizontal traces H1, H2, H3 and H4 in the horizontal direction of the scanned image. Similarly the right border 1330 is detected with another set of four equally spaced horizontal traces H5, H6, H7 and H8. With the coordinates of these straight lines, the intersection 1340 of the left and top border and the intersection 1350 of the right and top border are determined. Based upon the print resolutions (ppi) of a rectangular bar-code element and the coordinates of these two intersections, the approximate location of a first pair of positioning hole is estimated. The coordinates of the first pair of positioning holes are then calculated with all light colored pixels within the estimated area by simple average:

$Xp=(1/N)*Sum(Xi)$ $Yp=(1/N)*Sum(Yi)$ where N is total number of, white pixel in the estimated area of positioning hole, Xi, Yi are the coordinates of white pixels in the estimated area of positioning hole.

using the coordinates of the knowing pair of positioning holes, all coordinates of the 2D bar-code data elements are calculated. The data can then be read off the stored image very efficiently. After finishing calculating the coordinates of first row of data elements, the rest of rows are deducted.

Figure 14B:
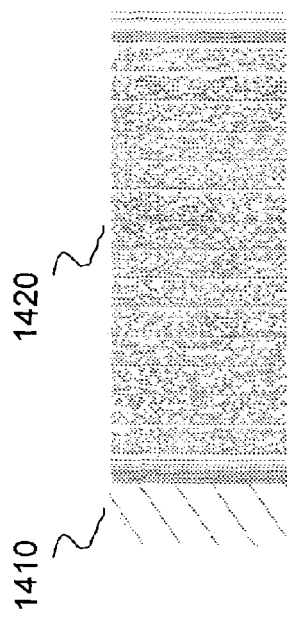
FIGS. 14B and 14C show two exemplary of positioning lines attached to the 2D bar-code.
Figure 14C:
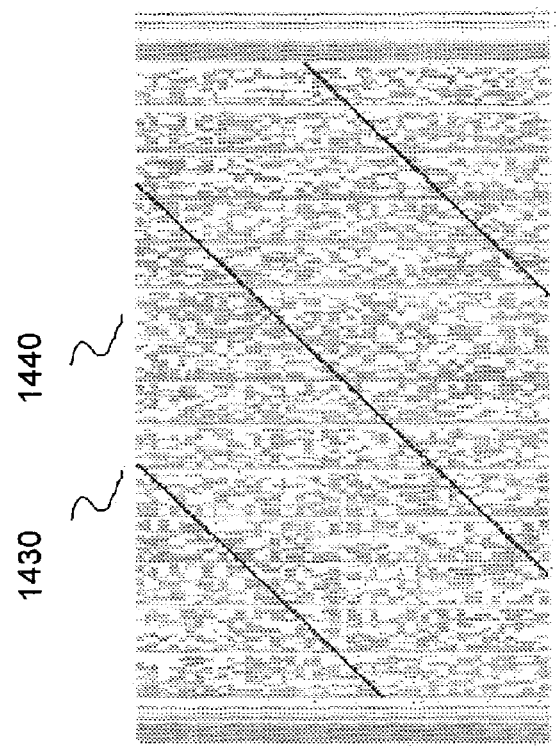
Figure 14A:
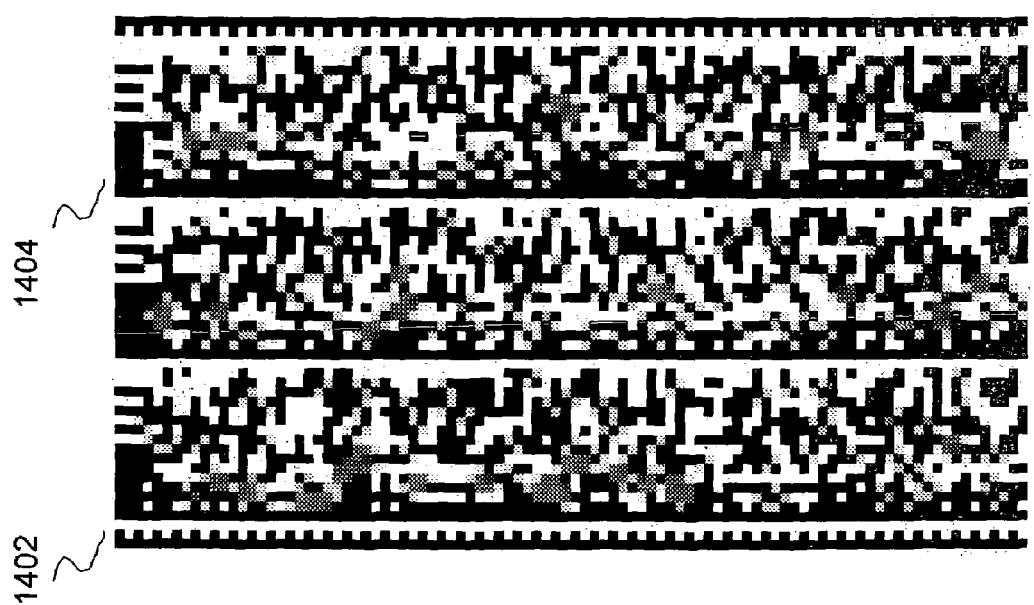
FIG. 14A shows a n alternative positioning teeth used with the 2D bar-code.

FIG. 14A shows a 2D bar code 1404 sandwiched between a pair of positioning teeth 1402. These positioning teeth 1402 are used for guiding scanning devices to correct image stretching and squeezing. In normal situation, the number of rows in a scanned image is evenly distributed between the positioning teeth. However, in certain circumstance, the scanned image may be distorted due to the distance and angle between the scanning device and the 2D bar-code symbol. On the one hand, a scanned image may be stretched; there are more rows scanned between certain positioning teeth than others. On the other hand, the image may be squeezed; there are missing scanned rows between certain positioning teeth. Based on the fact of even distribution for all positioning teeth, some rows are deleted in the stretched area; additional rows are added by interpolating the adjacent scanned rows in the squeezed area.

Referring to FIG. 14B, a set of positioning lines 1410 are attached to the left side of a 2D bar-code 1420. These positioning lines comprise a plurality of equally spaced parallel lines having a different slope than the horizontal axis of the 2D bar-code 1420. The positioning lines may be located at either side or both sides of a 2D bar-code symbol 1420. In another embodiment, FIG. 14C shows the positioning lines 1430 are drawn on top of a 2D bar-code symbol 1440 with a different color used for the dark colored bars in the 2D bar-code. The decoding of the positioning lines and 2D bar-code data elements are based on the reflection of the different scanning light color. For example, a 2D bar code uses blue colored bars and white colored spaces. The overlapping positioning lines may be printed with a special black ink. When scanning device uses a blue light source to scan the 2D bar-code symbol, both the bars and spaces would reflect the blue light while the black positioning line absorbs the blue light. Therefore, the positioning lines are read using the blue light source in a scanning device first before attempting to read the bar-code data with an infrared light source. That is because the infrared light goes through the special black ink, but the blue and the white color reflect distinctly. With the use of two different light sources, scanning devices are able to read the bar-code data elements and the positioning lines in two different paths.

Figure 15:
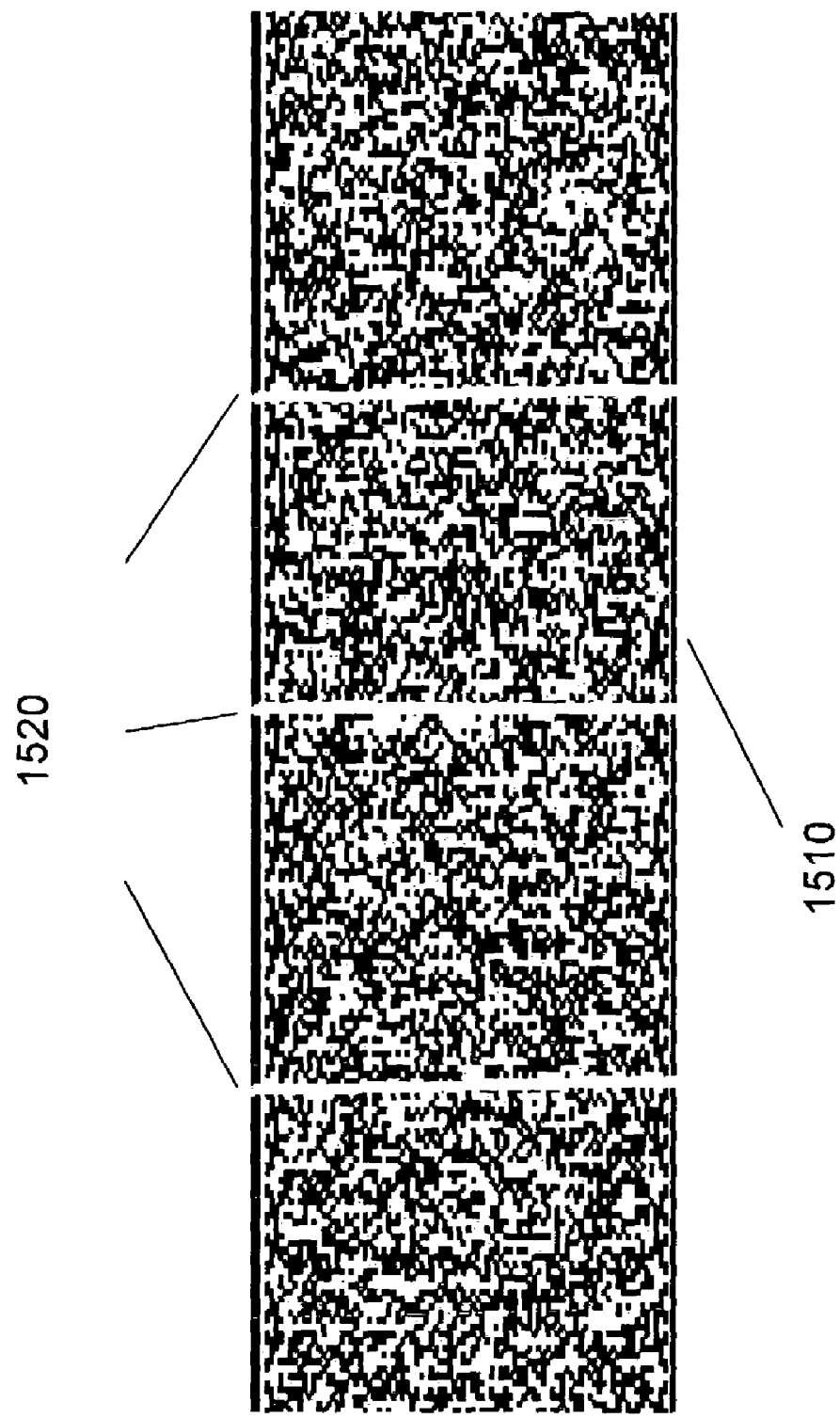
FIG. 15 shows a 2D bar-code with visible dividing marks corresponding to different paragraphs of an article encoded in it.

Referring now to FIG. 15, a 2D bar-code 1510 with a plurality of visible physical division marks 1520 for separating information stored in the 2D bar-code 1510. According to one embodiment, each portion of the separated bar-code corresponds to different paragraph of an article.

Figure 16:
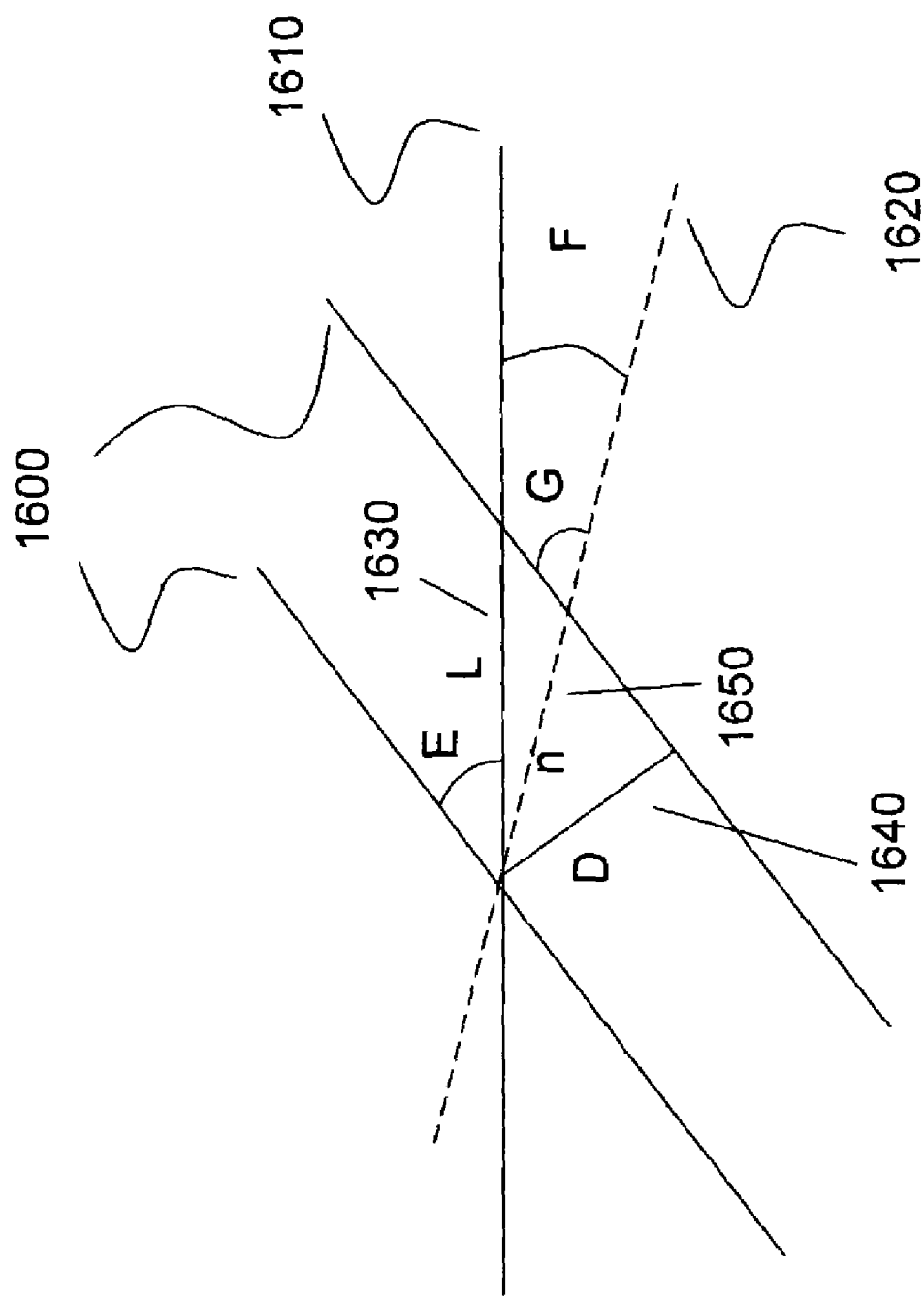
FIG. 16 depicts a detailed geometry to demonstrate how positioning lines guide the scanning device.

An exemplary usage of the positioning lines in FIGS. 14B and 14C is illustrated in FIG. 16, which depicts the geometry of positioning lines 1600, a scan line 1620 and the horizontal axis 1610 of a 2D bar code. A set of parallel positioning lines 1600 is intersected by the horizontal axis 1610 and by the scan line 1620. The perpendicular distance 1640 between positioning lines 1600 is denoted as D. The distance 1630 on the horizontal axis between two intersections with the positioning lines 1600 is L. The distance 1650 on the scan line between two intersections with the positioning lines is n. The angle between the scan line 1620 and the bar-code horizontal line 1610 is F. The angle between the horizontal axis 1610 and the positioning line 1600 is E. The angle between the positioning line 1600 and the scan line 1620 is G, which is the sum of E and F. The following equations are used to calculate angles F and G:

$F=90-E-ar\cos(D/n)$ $G=ar\sin(D/n)$

Figures 17A, 17B:
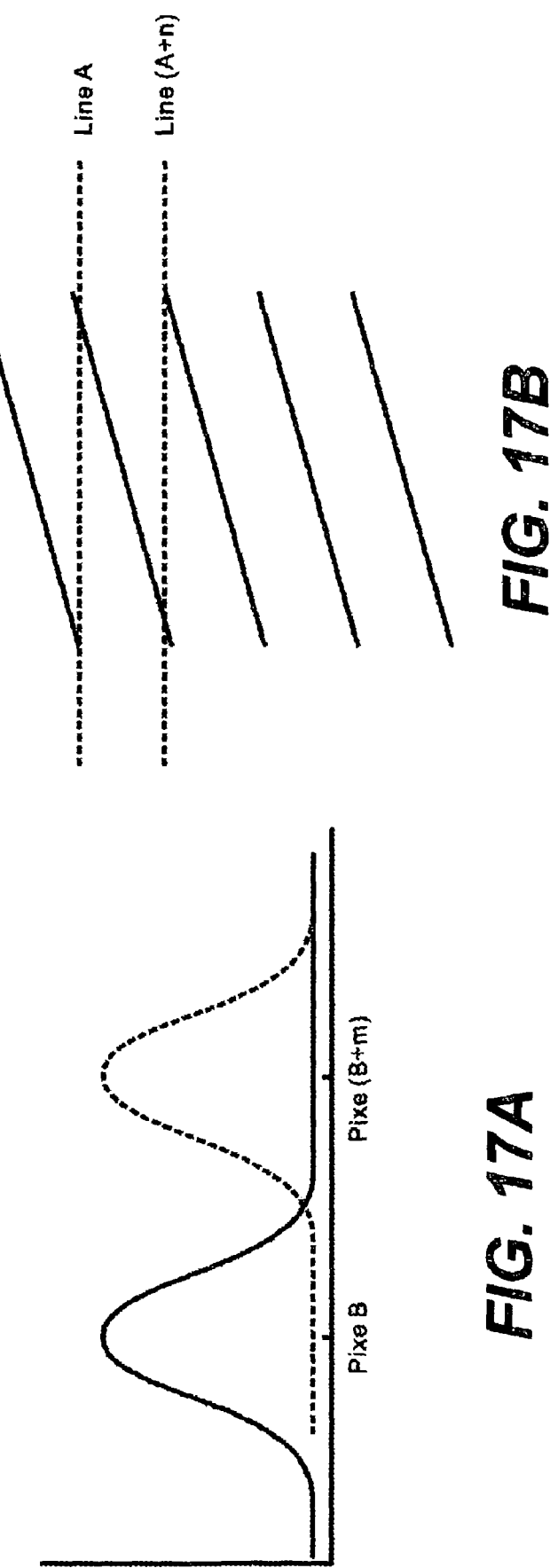
FIGS. 17A and 17B show the relationship between adjacent positioning lines and consecutive scanning lines.

FIGS. 17A and 17B show how scanning lines guide scanning devices. Generally, the resolution in a 2D bar-code's horizontal axis direction or x-direction is determined by the scanning device's resolution as x DPI. In the bar-code's vertical-axis direction or y-direction, the resolution is referred as y-resolution which is determined by the sampling rate of the scanning device as y DPI. In order to decode 2D bar-code properly, the distance between two scanning lines should be equal to H=1/y. For example, to achieve a 300 dpi, the scanning device needs to scan the 2D bar-code once every 1/300 inch in y-direction. When a first scan line intersected by two adjacent positioning lines, the distance n between these two intersections is recorded and used to calculate angle G in the aforementioned formula. Then the scanner compares two consecutive scan line images shown in FIGS. 17A and 17B. Two consecutive scan lines, line(A) and line(A+n) are shown in FIG. 17B. The corresponding images are plotted overlapping each other in FIG. 17A. Two crests pixel(B) and pixel(B+m) represent the intersections of one positioning line with two consecutive scan lines. Therefore, the distance between the crests is the distance between two scan lines as m pixels, is m*x, where x is the distance between two consecutive pixels. Based upon the geometry illustrated in FIG. 16, the y-direction distance between two scan lines is then calculated in the following:

$$V=(m*x)*\tan(G)$$

When the y-direction distance V is equal to the sampling distance H, a new row of the scanned image is recorded. This process continues until the entire image has been scanned.

Figure 19:
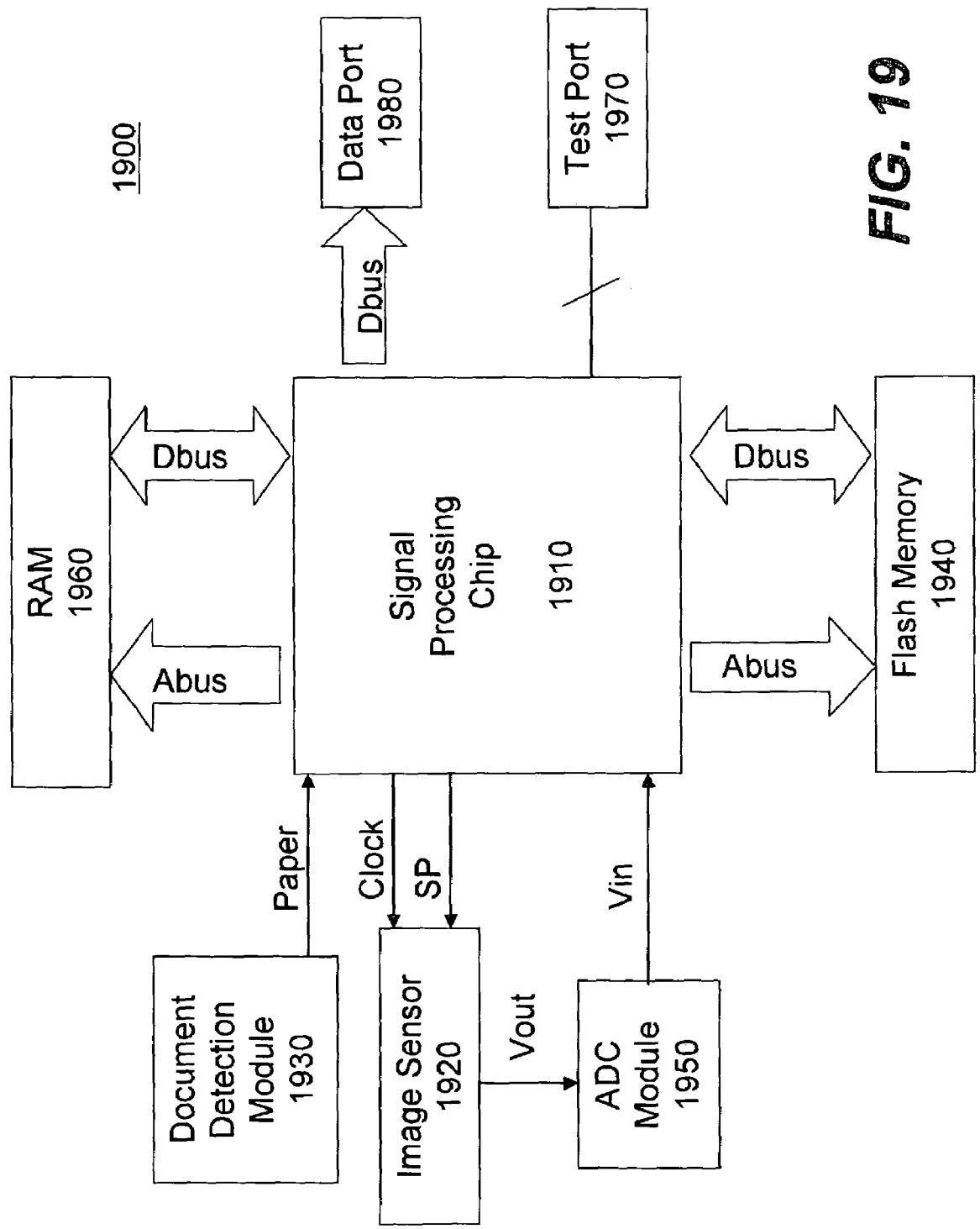
FIG. 19 shows a typical block diagram of a scanner.

Referring now to FIG. 18 in conjunction with FIGS. 4 and 5, an exemplary CIS based scanner has a 448 pixels wide scanning head. When a bar-code element having a module width of 4-pixel, the mapping of the sensor to the 2D bar-code 400 is as follows: 8-pixel to cover white spaces on either side of the bar-code; 12-pixel to cover the left border 530 and right 540 border; and 408 pixels for the bit-stream data area 550. 408-pixel represents 102 data elements since each element is 4-pixel wide. That means 102 bits of information can be stored in one row of the bar-code 400. In one embodiment, to store 127 codewords, 36-rows of data elements are required. Using 4-pixel to represent one module as the width of the data element is based on the prior experience for the reliability of decoding a 2D bar-code. Generally, the minimum 2D bar-code data element length/width may be determined by the following formula:

$$BL>=4*(Rp/Rs)\text{pixels}$$

where: BL is the minimum dimension of a 2D bar-code data element
Rp is printer resolution
Rs is scanner resolution Referring now to FIG. 19, a typical scanning device 1900 comprises of a signal process chip 1910, an image sensor 1920, a document detection module 1930, flash memory 1940, ADC module 1950, RAM 1960, testing port 1970 and data port 1980. The core of a scanning device is the signal processing chip 1910 whose main functions include: controlling all attaching modules; decoding binary bar-code data; storing the decoded information in RAM 1960; and outputting required data to data port 1980. Basing on the clock and SP signal sending from signal processing chip 1910, the image sensor 1920 catches the generated electric voltage (Vout) from the light reflected by a scanned image. The resulting digital data (Vin) is then sent back to signal processing chip 1910. The document detection module 1930 generates a "paper" signal when detecting a document is inserted. The signal processing chip 1910 controls the start and end procedure of a scanning basing on this "paper" signal. The software used by the signal processing chip 1910 is loaded into the flash memory 1940. ADC module 1950 converts the analogue data into digital data. The test port 1970 is used for up loading software. The data port 1980 is used for outputting the data from RAM 1960 to another computer.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for encoding a 2D symbol, the method comprising:
converting binary data into a first bit-stream of codeword data;
calculating a set of error correction codewords from the first bit-stream based on a predefined error correction level;
combining the first bit-stream and the set of error correction codewords into a second bit-stream of codeword data;
dividing the second bit-stream into a set of equally sized data segments;
adding a set of control information codewords into each of the data segments;
adding a data segment divider between the data segments;
providing a top border and a bottom border, a left border and a right border circumscribing the data segments such that the 2D symbol is so created, wherein the top boarder includes at least one start code pattern and only one terminator code pattern along a line, both the start code pattern and the terminator code pattern include alternating light and dark bars in accordance with a predefined rule, and the start code pattern is repeated enough times as necessary to accommodate all of the data segments.

2. The method as recited in claim 1, further comprising:
re-arranging at least two of the second bit-stream in an interleaved order.

3. The method as recited in claim 1, wherein the second bit-stream is represented in bars and spaces, the method further comprising:
performing a masking operation or bitwise-XOR operation on the second bit-stream with a predefined mask to avoid the bars concentrated in a particular area.

4. The method as recited in claim 1, wherein the bottom border includes at least one end code pattern and one terminator code pattern to facilitate detection of an orientation of the 2D symbol, both of the start code pattern and end code pattern are directional.

5. The method as recited in claim 4, wherein the start code pattern of the top boarder and the end code pattern of the bottom border includes a number of alternated bars and spaces, the start code pattern as well as the end code pattern has a number of modules in accordance with a predefined width ratio.

6. The method as recited in claim 1, wherein the left border and the right border are a pair of identical positioning blocks including alternating bars and spaces according to a predefined pattern.

7. The method as recited in claim 6, wherein the second bit-stream is represented by bars and spaces in a data element area, each of the bars and spaces in the left or right border corresponding to one or more of bars and spaces in the data element area.

8. The method as recited in claim 6, wherein each of the bars or spaces in the left or right border facilitates determination of vertical print resolution of a scanner used to scan the 2D symbol.

9. The method as recited in claim 6, wherein each of the bars or spaces in the left or right border dictates the vertical print resolution, and each of bars or spaces in the top or bottom border dictates a horizontal print resolution of the 2D symbol to a scanner in order to scan the 2D symbol more efficiently.

10. The method as recited in claim 6, wherein each of the bars or spaces in the left or right border indicates whether a scanned image of the 2D symbol is distorted, and facilitates correction of the scanned image if the scanned image is distorted.

11. The method as recited in claim 1, wherein the second bit-stream is represented in bars and spaces in a data element area, and the method further comprising:
adding a set of equally spaced parallel positioning lines to one side or both sides of the 2D symbol, the positioning lines having a different slope from a horizontal axis of the 2D symbol to facilitate determinations of an orientation of the 2D symbol as well as the bars and spaces in the data element area.

12. The method-as recited in claim 1, further comprising:
superimposing a set of equally spaced parallel positioning lines on the 2D symbol, the positioning lines having a different slope from horizontal axis of the 2D symbol.

13. The method as recited in claim 12, wherein the positioning lines are in a color different from that of the 2D symbol to be readily determined from an scanner image of the 2D symbol by a scanner.

14. The method as recited in claim 1, wherein the set of control information comprises:
total number of the data segments;
an interleaf toggle;
an pre-selected error correction level;
a predefined mask type; and
a data segment number.

15. The method as recited in claim 1, wherein each of the data segments includes codeword that is a matrix of three columns by three rows of bars or/and spaces.

16. A method for decoding a 2D symbol including a plurality of bars and spaces in a data area representing a bit-stream of codeword data from a binary data file, the data area circumscribed by a top border, a bottom border, a left border and a right border, a plurality of data segment dividers dividing the bit-stream data area into a plurality of data segments, the method comprising:
scanning the 2D symbol in entirety to produce a stored image;
searching in the stored image for the top border having at least a start code pattern and a terminator code pattern along a line, wherein the start code pattern and the terminator code pattern include alternating light and dark bars in accordance with a predefined rule, and the start code pattern is repeated enough times, if necessary, to accommodate all of the data segments;
determining a horizontal axis and a vertical axis of the symbol image based on the start code pattern and the end code pattern;
calculating a scan line angle between a scan line and the horizontal axis of the stored image;
determining a print resolution from the stored image;
locating the plurality of data segment dividers in the stored image;
retrieving a set of control information from the data segments;
restoring the bit-stream of codeword data from the data segments; and
converting the bit-stream of codeword data into original binary data file.

17. The method as recited in claim 16, wherein the restoring of the bit-stream of codeword data comprises applying an error correction operation on the bit-stream of codeword data.

18. The method as recited in claim 17, wherein the restoring of the bit-stream of codeword data further comprises performing masking operations on the bit-stream of codeword data using a predefined mask based on the control information if required.

19. The method as recited in claim 18, further comprising: calculating all coordinates for the plurality of data elements between the left border and the right border starting from a first segment divider, and determining the plurality of codeword information using the coordinates of the data elements.

20. The method as recited in claim 18, wherein the scanning of the 2D symbol is performed by a scanner including a software module configured to determine an orientation of the 2D symbol and a memory space for the stored image.

21. The method as recited in claim 20, wherein the stored image is first processed by the software module in accordance with the left border and the right border so that the bit-stream of codeword data can be determined.

22. A method for decoding a 2D symbol including a plurality of bars and spaces in a data area representing a bit-stream of codeword data from a binary data file, the data area circumscribed by a top border, a bottom border, a left border and a right border, a plurality of data segment dividers dividing the bit-stream data area into a plurality of data segments, the method comprising:
scanning the 2D-symbol to produce a first scan line in a scanned image;
searching in the scanned image for the top border having a start code pattern, and the bottom border having an end code pattern;
switching to a decoding method to scan the 2D symbol in entirety before decoding when the scanned image is determined upside down or is an mirror image;
(a) scanning the 2D symbol into a scanned image until a first data segment is detected;
(b) retrieving a set of control information codewords for the first data segment after error-correction;
(c) switching to the decoding method for the graphic symbol image in entirety if the first data segment is out of sequence, or the bit-stream data area in the first data segment is stored in an interleaved order;
(d) retrieving the plurality of codeword information in the bit-stream data area using the coordinates of the data elements in the current data segment;
(e) restoring a first part of the first bit-stream of codeword data for the current data segment;
repeating steps (a) through (e) for every data segment divider is detected till the bottom border is detected.

23. The method as recited in claim 22, wherein an element of the codeword data includes a matrix of three columns by three rows of spaces or bars.

24. The method as recited in claim 23, wherein the 2D symbol is expandable in accordance with the binary data file.

25. The method as recited in claim 22, wherein the control information comprises:

total number of the data segments;
   an interleaf toggle;
   an pre-selected error correction level;
   a predefined mask type; and
   a data segment number.

26. A 2D symbol embedding information readable by a scanning device to recover the information, the 2D symbol comprises:

a data information area;
   a top border and a bottom border, a left border and a right border circumscribing the data information area, both of the top border and the bottom border being directional by embedding at least one start pattern and only a stop pattern, respectively, wherein the start and stop patterns are positioned along a line, and either one of the start and stop patterns includes alternating dark and light bars in accordance with a predefined rule, and the start pattern is repeated enough times, if necessary, to accommodate the data information area including at least a data segment generated from a bit-stream including binary data and error correction codewords; and wherein, when the bit-stream exceeds a certain line to require two or more data segments, a data segment divider is provided to separate two adjoining data segment.

27. The 2D symbol as recited in claim 26, wherein the top border includes at least one start code pattern and one terminator code pattern, and the bottom border includes at least one end code pattern and one terminator code pattern to facilitate detection of an orientation of the 2D symbol.

28. The 2D symbol as recited in claim 27, wherein the start code pattern of the top boarder and the end code pattern of the bottom border includes eight alternated bars and spaces, the start code pattern has width ratio of 3:2:1:1:1:2:2:3 modules and the end code pattern has width ratio of 3:1:2:3:2:2:1:1 modules.

29. The 2D symbol as recited in claim 27, wherein the left border and the right border are a pair of identical positioning blocks including alternating bars and spaces according to a predefined pattern.

\* \* \* \* \*